(12) United States Patent
Hanebeck

(10) Patent No.: US 12,216,781 B2
(45) Date of Patent: Feb. 4, 2025

(54) SYSTEMS FOR MULTI-PARTY DASHBOARDS

(71) Applicant: TRUCKL LLC, Dallas, TX (US)

(72) Inventor: Hanns-Christian Leemon Hanebeck, Dallas, TX (US)

(73) Assignee: TRUCKL LLC, Dallas, TX (US)

( * ) Notice: Subject to any disclaimer, the term of this patent is extended or adjusted under 35 U.S.C. 154(b) by 460 days.

(21) Appl. No.: 17/629,741

(22) PCT Filed: Jul. 24, 2020

(86) PCT No.: PCT/US2020/043550
§ 371 (c)(1),
(2) Date: Jun. 22, 2022

(87) PCT Pub. No.: WO2021/021651
PCT Pub. Date: Feb. 4, 2021

(65) Prior Publication Data
US 2023/0185942 A1    Jun. 15, 2023

Related U.S. Application Data

(60) Provisional application No. 62/886,920, filed on Aug. 14, 2019, provisional application No. 62/879,416, filed on Jul. 27, 2019.

(51) Int. Cl.
G06F 21/62    (2013.01)
G06F 16/23    (2019.01)

(52) U.S. Cl.
CPC ...... *G06F 21/6218* (2013.01); *G06F 16/2365* (2019.01)

(58) Field of Classification Search
CPC ............. G06F 21/6218; G06F 21/6272; G06F 16/2365; G06F 16/176; G06F 3/0643
See application file for complete search history.

(56) References Cited

U.S. PATENT DOCUMENTS

| 10,949,548 B2 * | 3/2021 | Mahatwo ................ G06F 16/27 |
| 2018/0262543 A1 | 9/2018 | Lappin |
| 2019/0104102 A1 | 4/2019 | Khan et al. |

OTHER PUBLICATIONS

International Search Report and Written Opinion for International Application No. PCT/US2020/0143550 mailed Oct. 15, 2020.

* cited by examiner

*Primary Examiner* — Paul E Callahan
(74) *Attorney, Agent, or Firm* — Marshall, Gerstein & Borun LLP

(57) ABSTRACT

Systems and methods for supply chain management are provided. The systems and related methods create, share and allow updating of electronic records containing supply chain event data and supply chain documents relevant to the execution of supply chain processes. The system and related methods further allow the storing of supply chain event data, supply chain documents, electronic records of supply chain processes and summary files of electronic records of supply chain processes on one, two or more distributed ledgers.

20 Claims, 22 Drawing Sheets

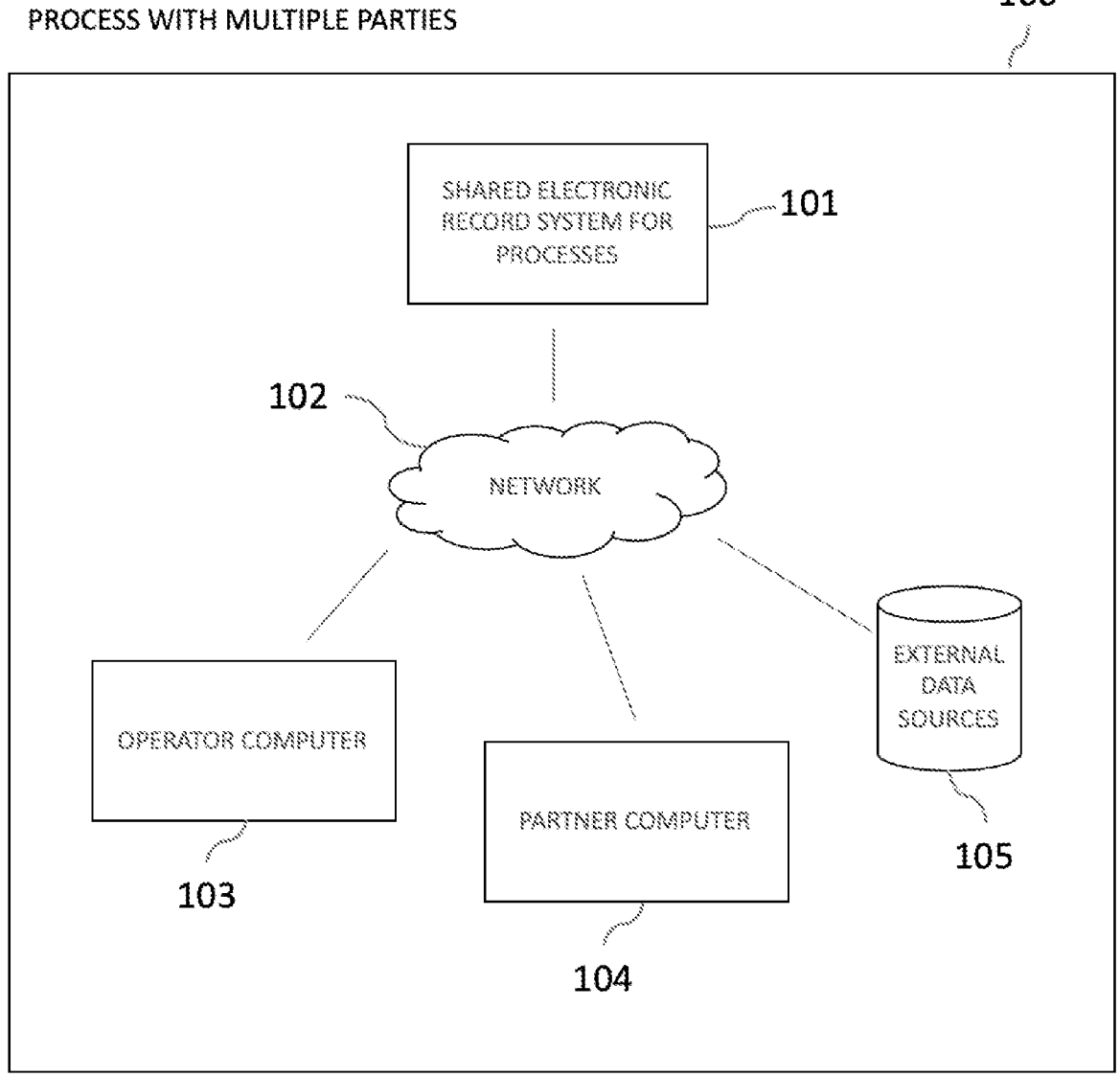
FIG. 1: A NETWORK FOR SHARING OF AN ELECTRONIC RECORD OF A PROCESS WITH MULTIPLE PARTIES

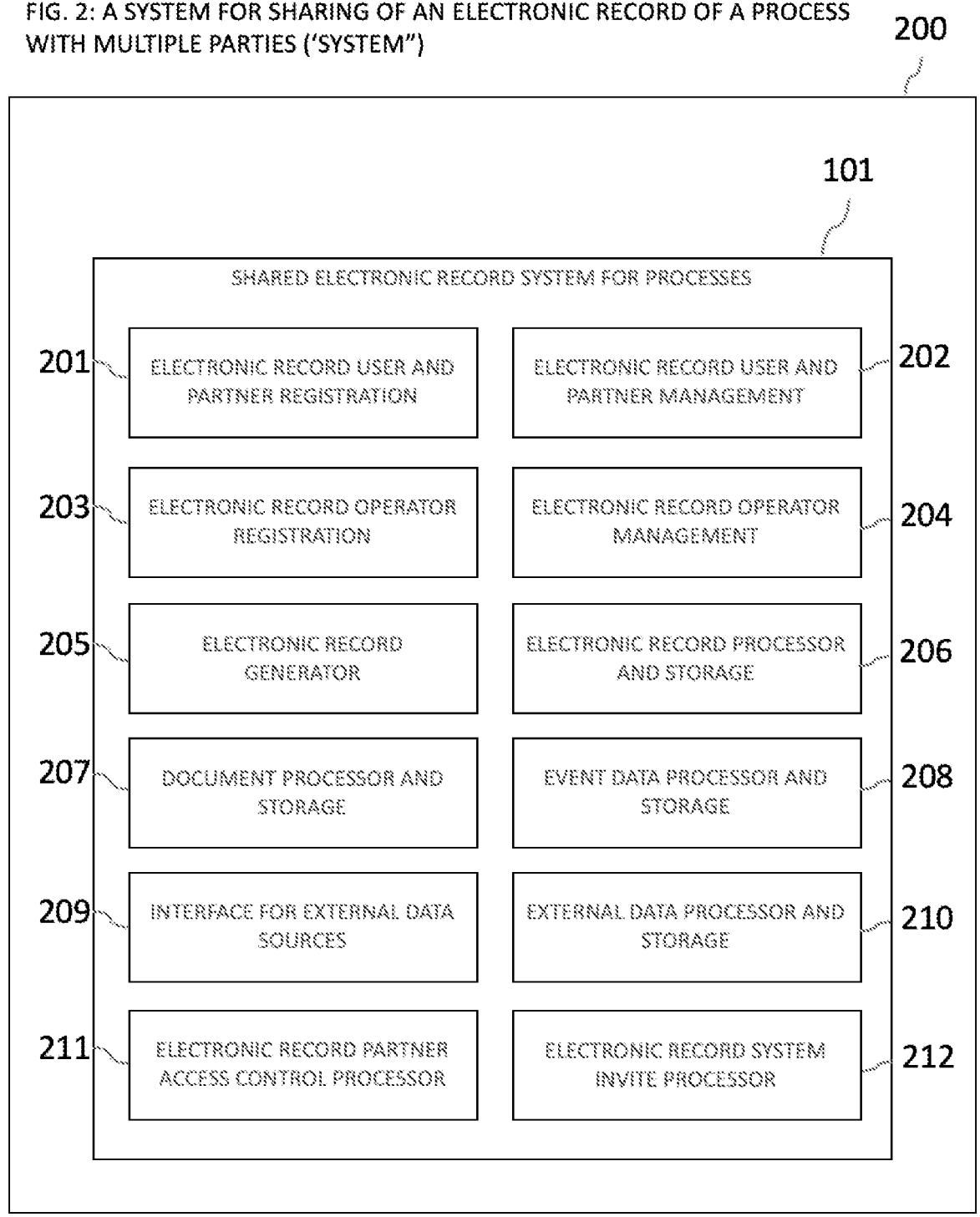
FIG. 2: A SYSTEM FOR SHARING OF AN ELECTRONIC RECORD OF A PROCESS WITH MULTIPLE PARTIES ("SYSTEM")

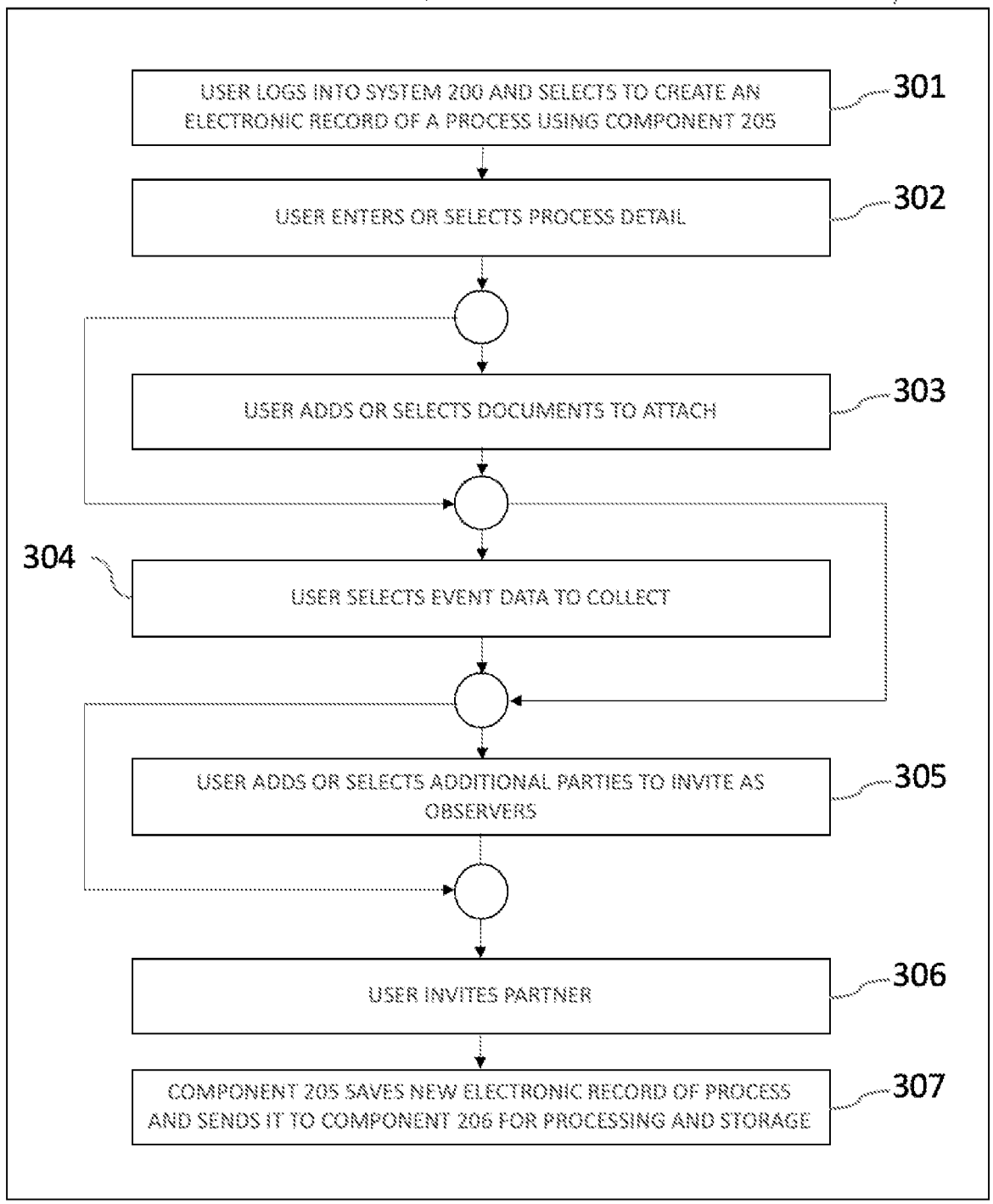

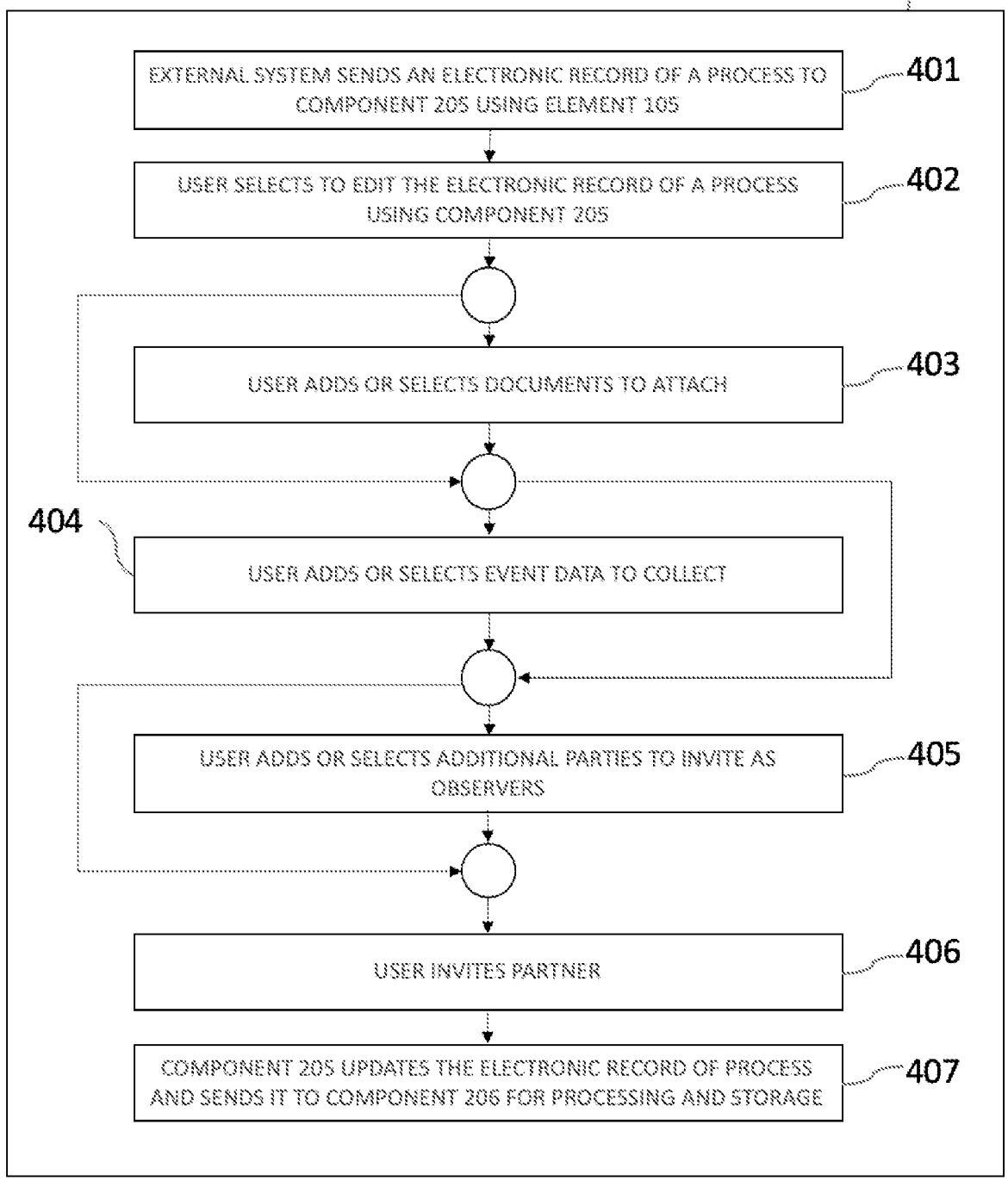

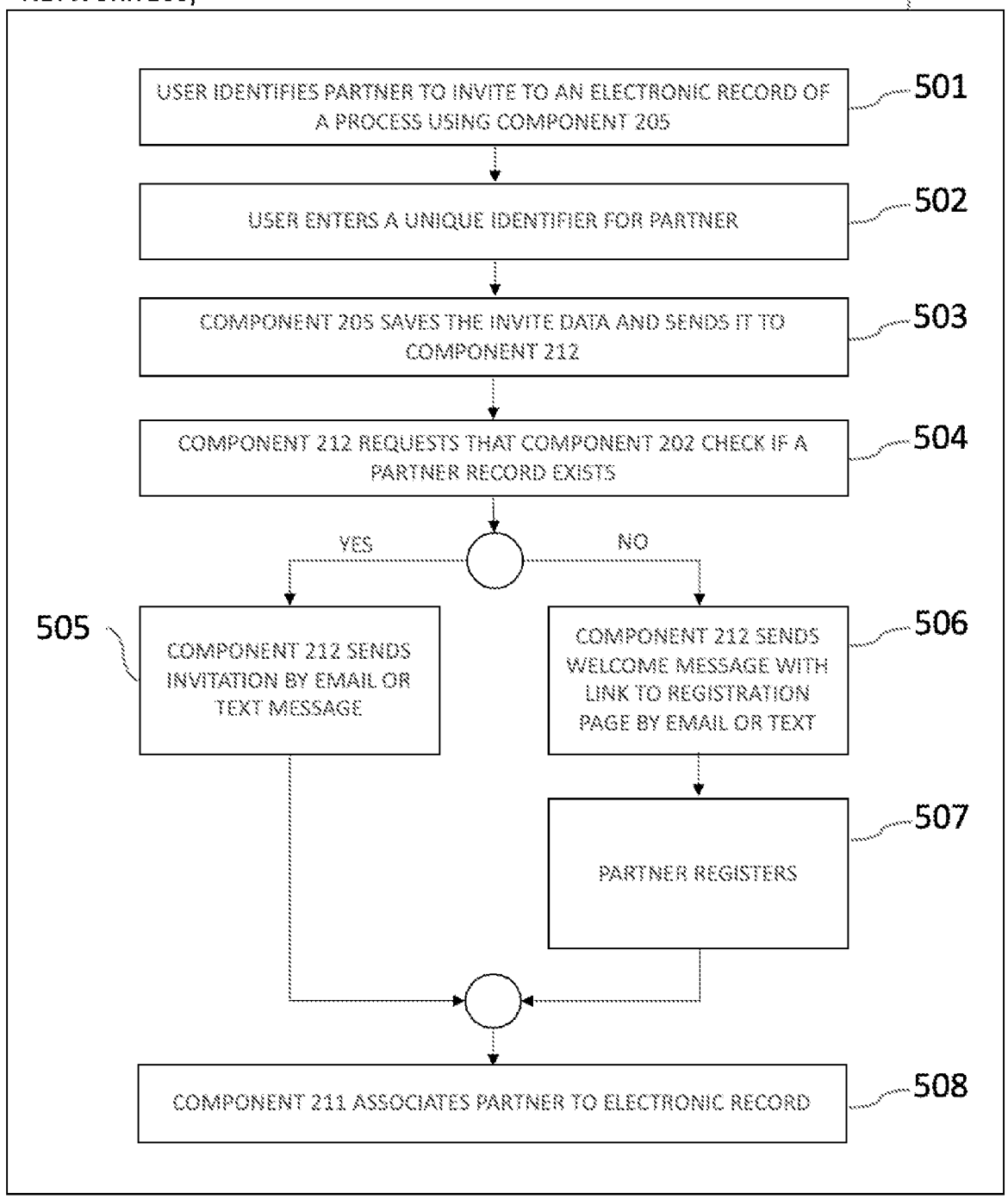

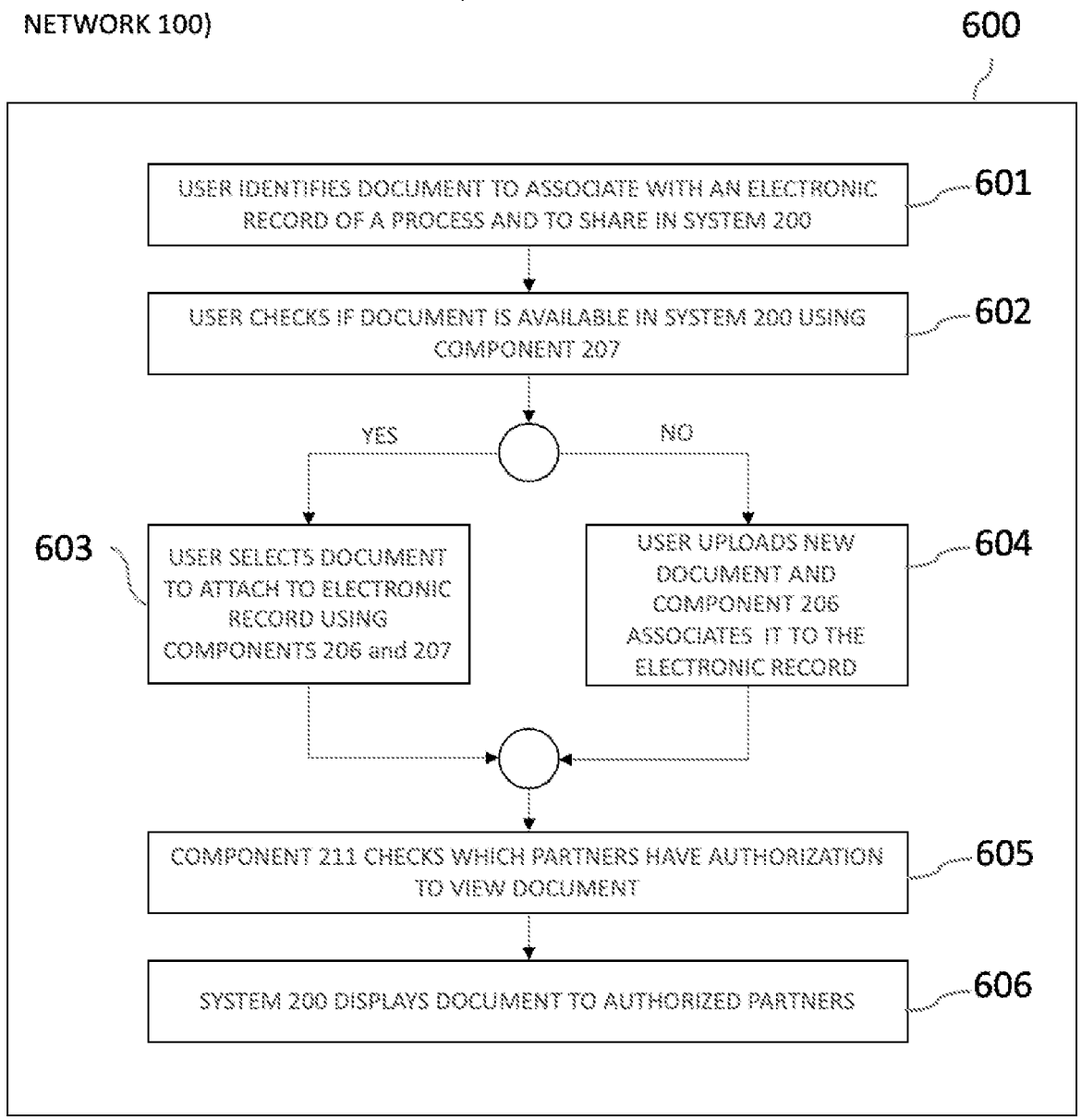

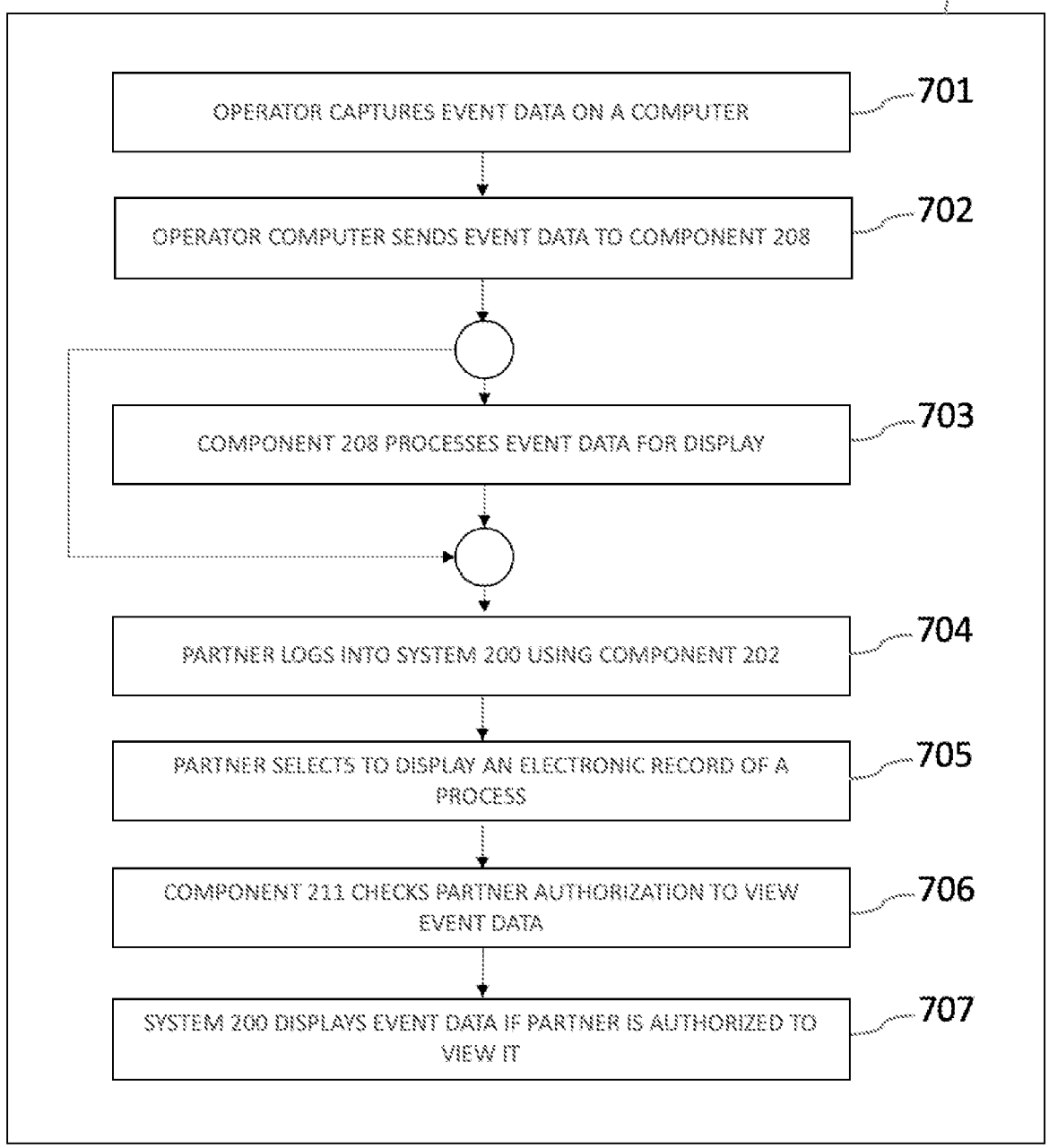
FIG. 7: FLOW TO SHARE EVENT DATA WITH A PARTNER SHARING AN ELECTRONIC RECORD OF A PROCESS (IN REFERENCE TO SYSTEM 200 AND NETWORK 100)

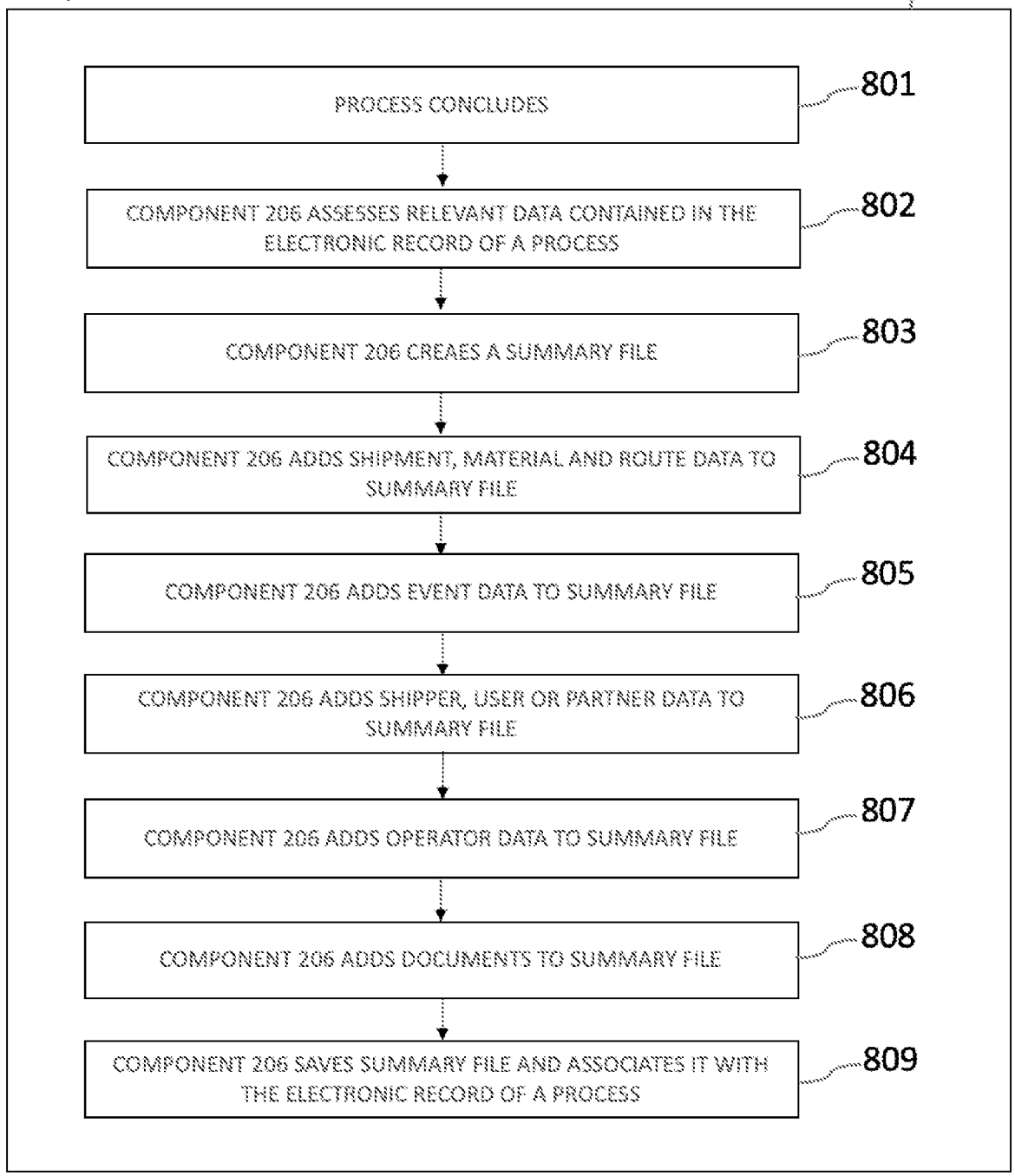

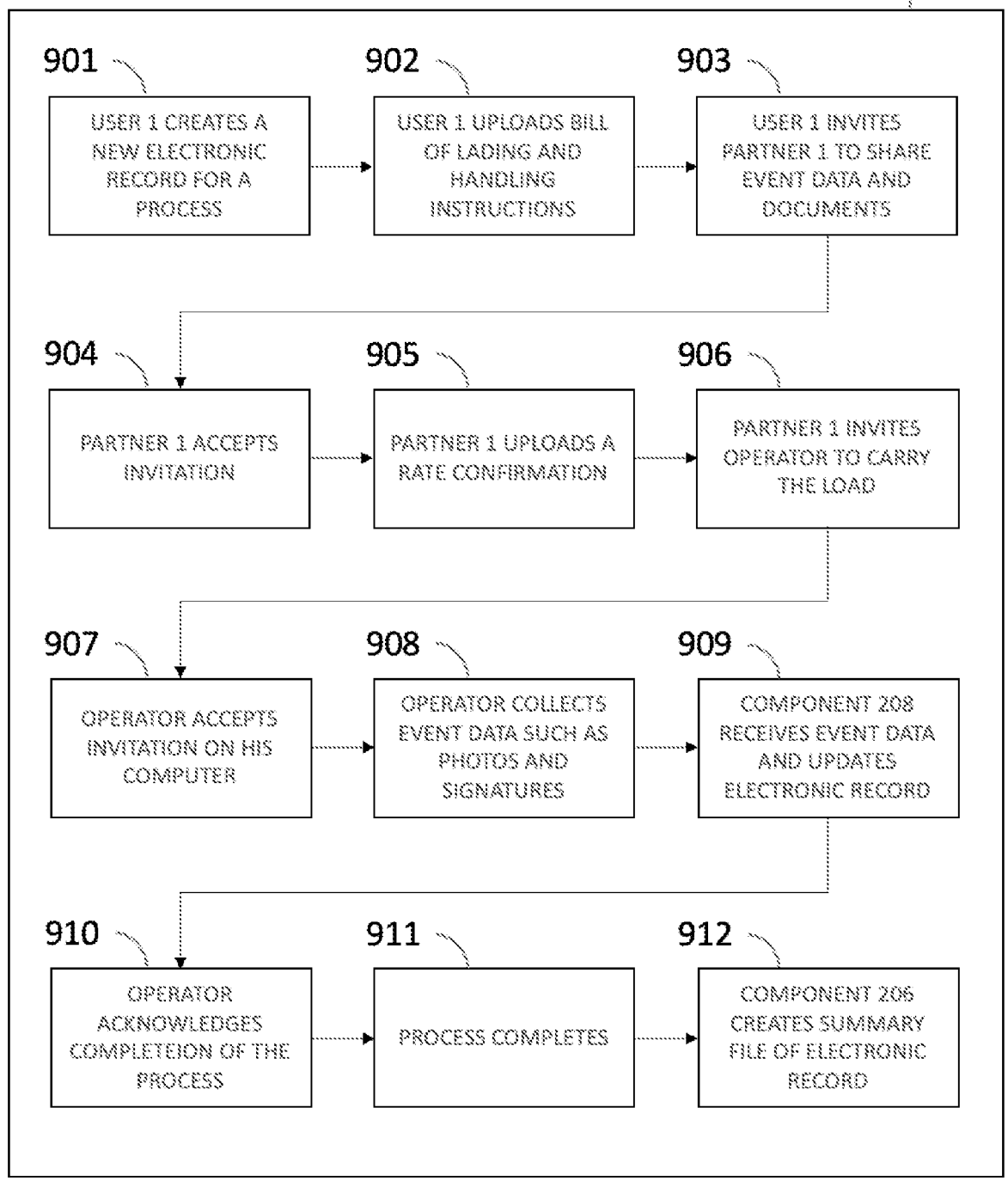

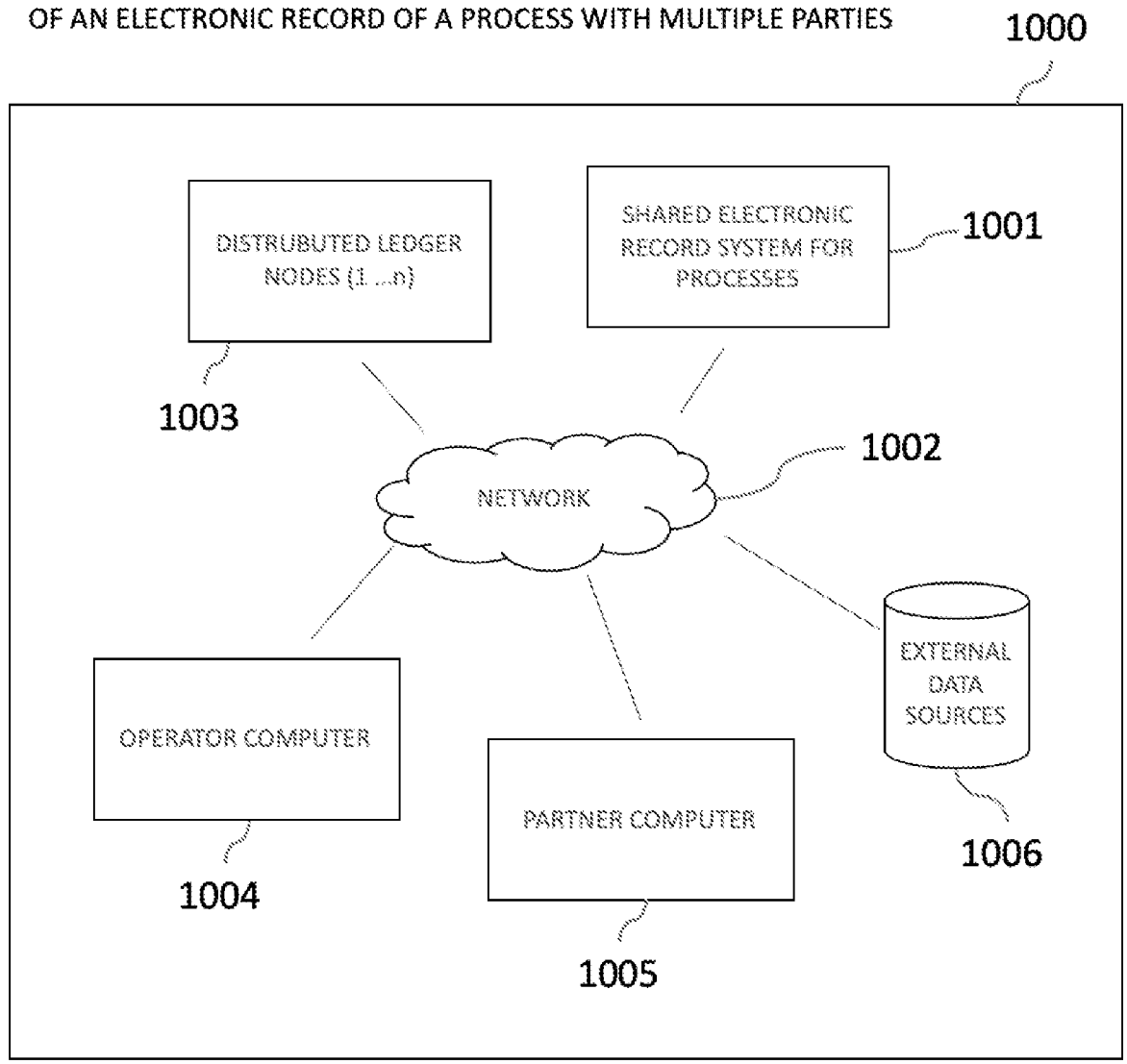
FIG. 10: A NETWORK COMPRISING A DISTRIBUTED LEDGER FOR SHARING OF AN ELECTRONIC RECORD OF A PROCESS WITH MULTIPLE PARTIES

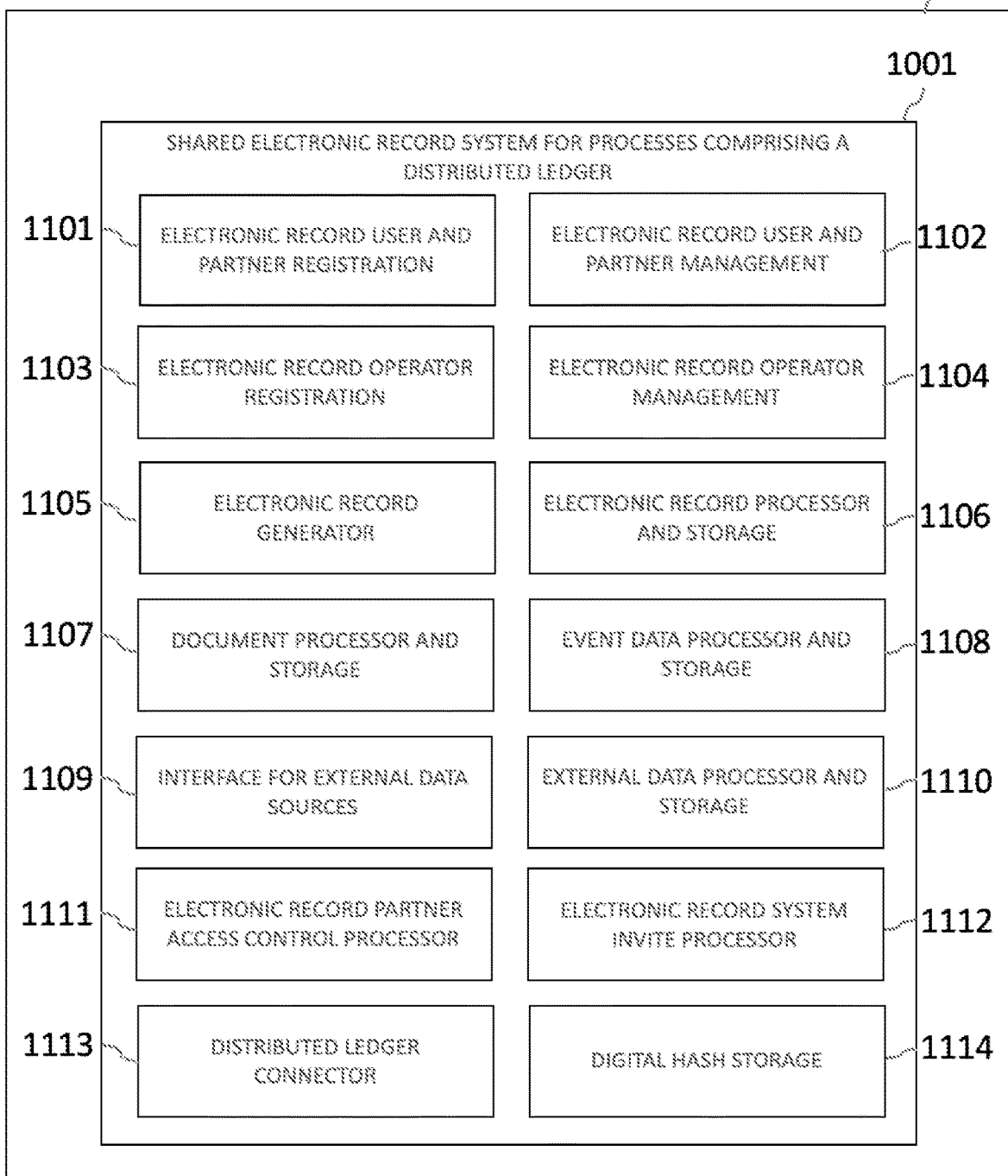
FIG. 11: A SYSTEM FOR SHARING OF AN ELECTRONIC RECORD OF A PROCESS WITH MULTIPLE PARTIES ("SYSTEM") COMPRISING A DISTRBUTED LEDGER

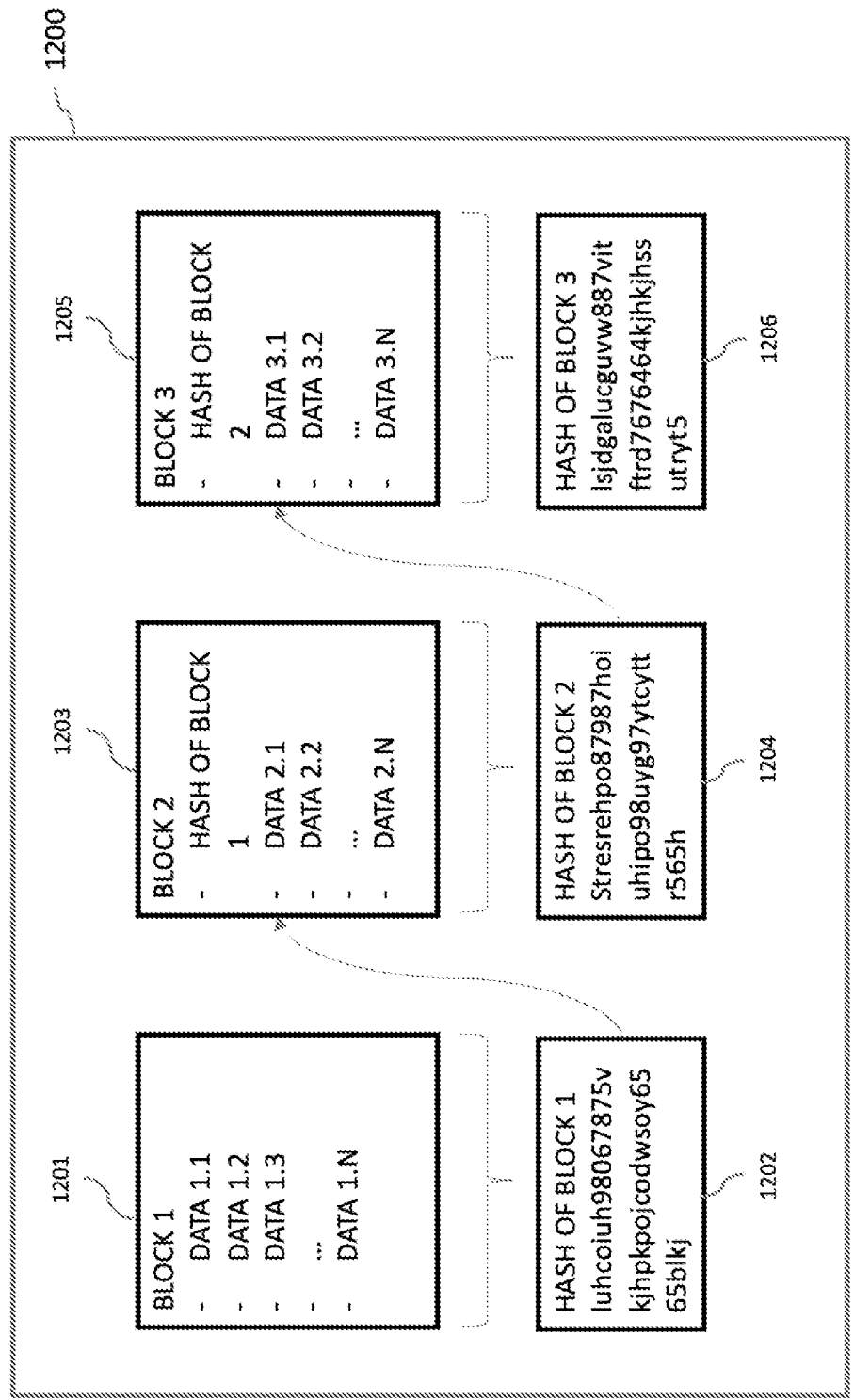
FIG. 12: A PRACTICAL EXAMPLE FOR LINKING OF DATA BLOCKS ON A DISTRIBUTED LEDGER USING HASHES

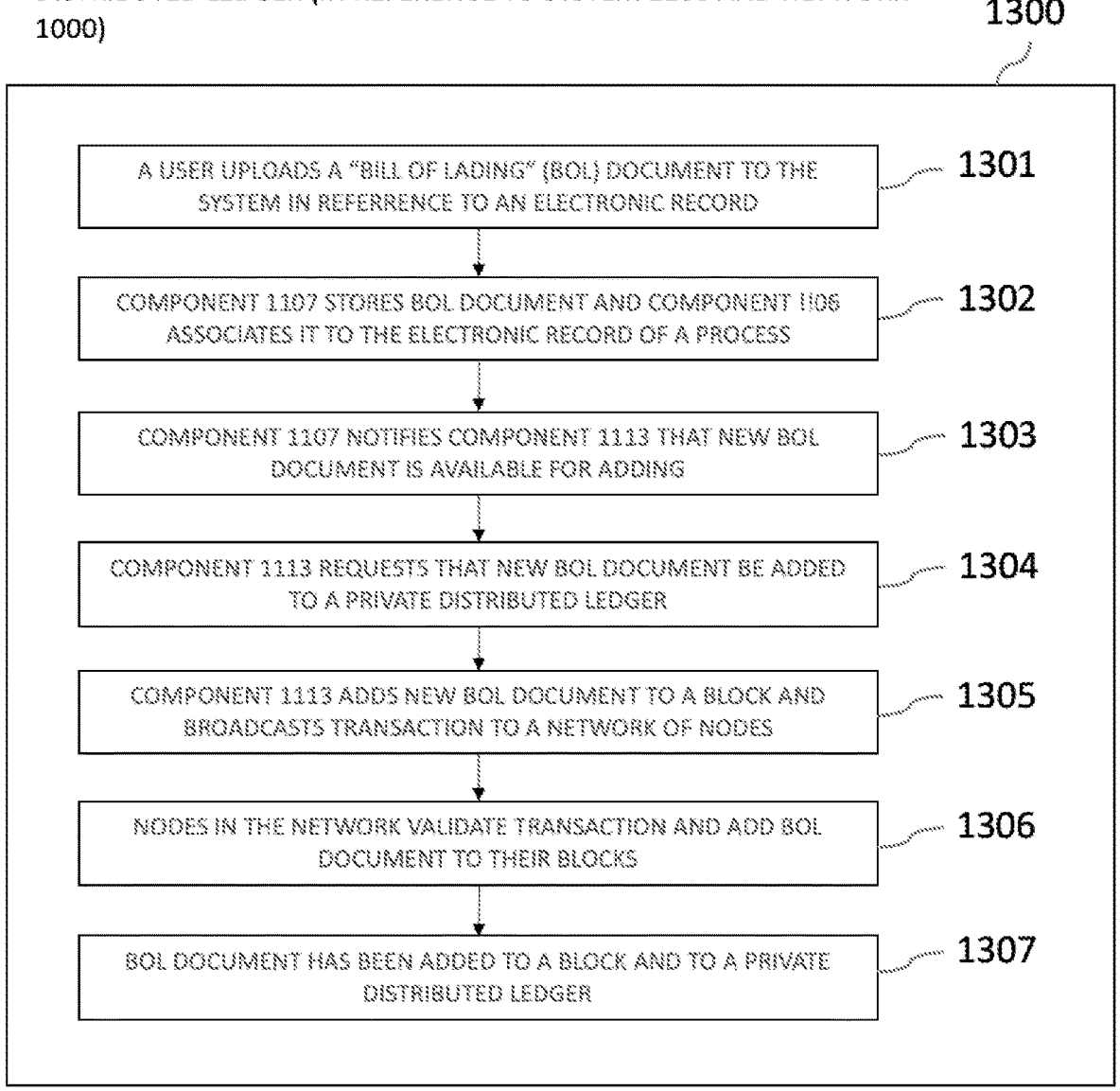

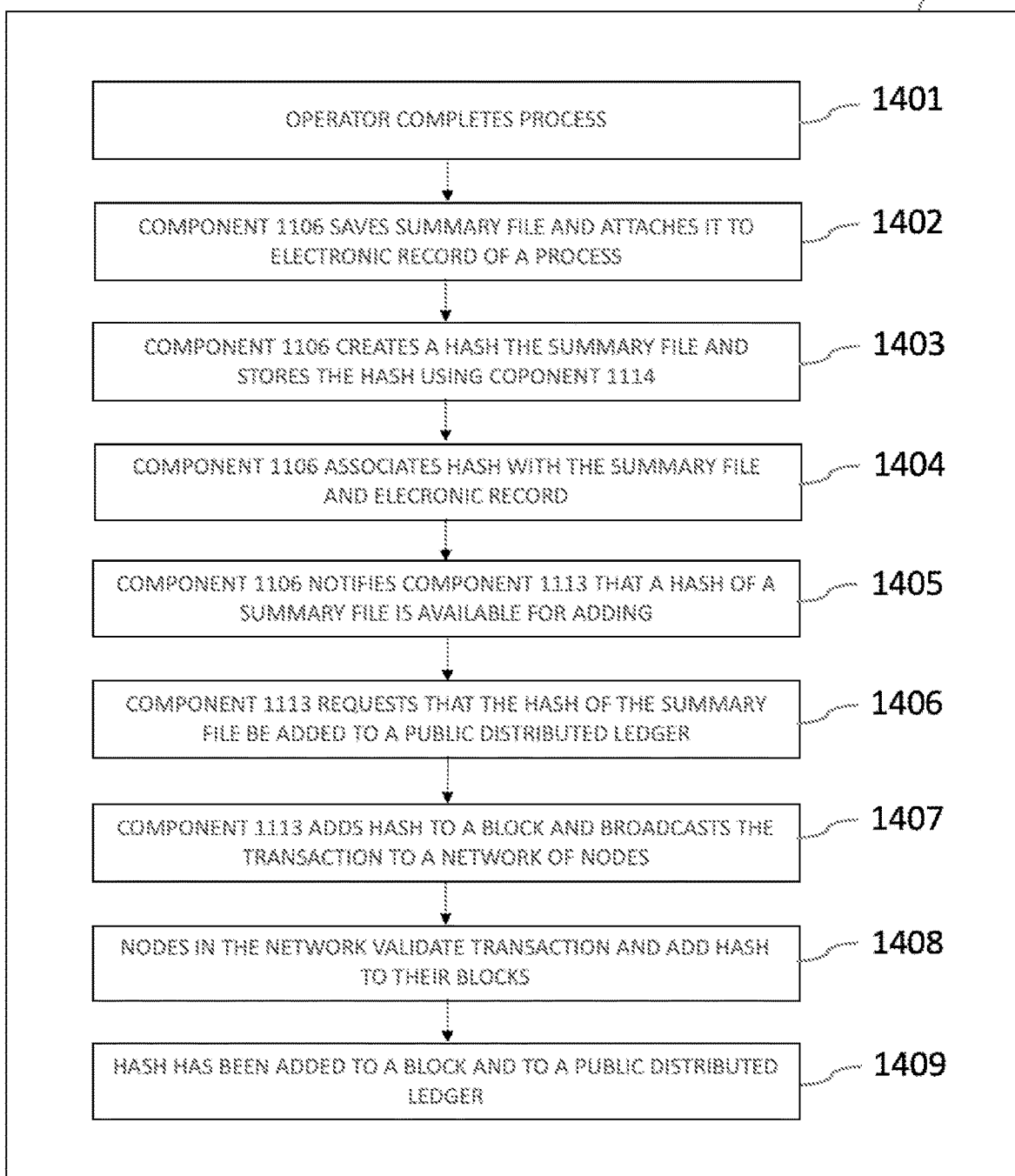
FIG. 14: FLOW TO WRITE A HASH OF A SUMMARY FILE OF AN ELECTRONIC RECORD OF A PROCESS TO A PUBLIC DISTRIBUTED LEDGER (IN REFERENCE TO SYSTEM 1100 AND NETWORK 1000)

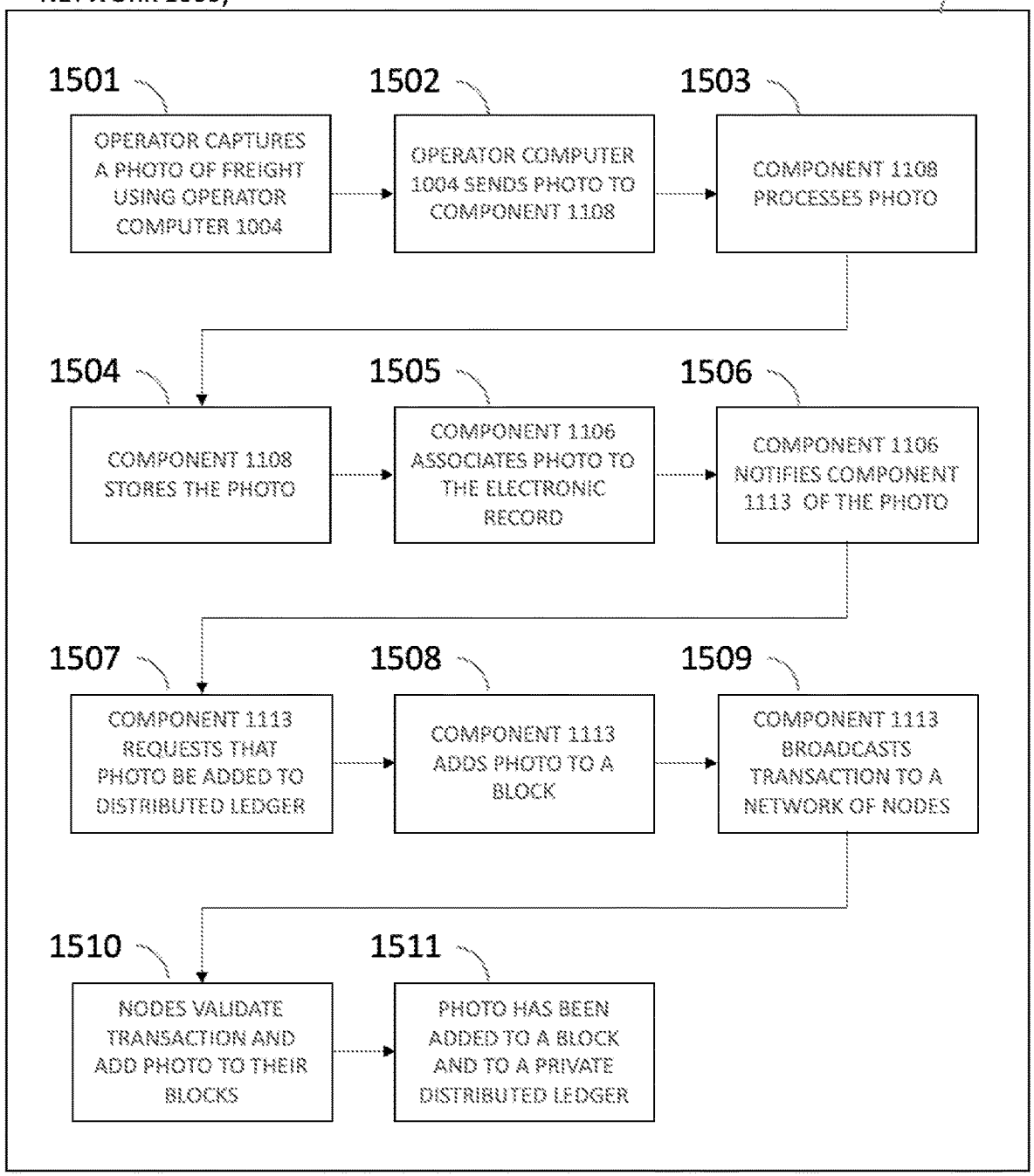

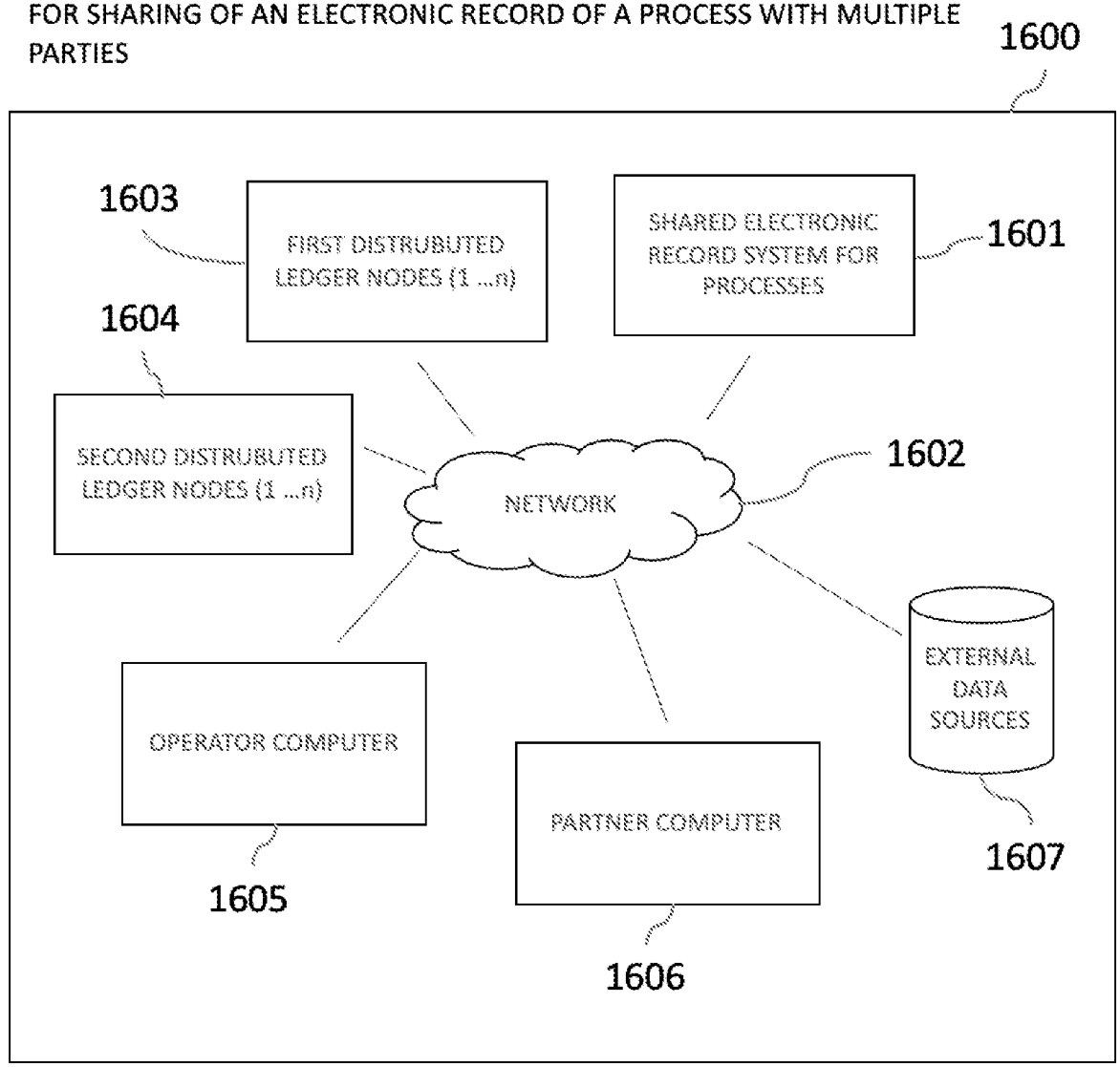
FIG. 16: A NETWORK COMPRISING TWO OR MORE DISTRIBUTED LEDGERS FOR SHARING OF AN ELECTRONIC RECORD OF A PROCESS WITH MULTIPLE PARTIES

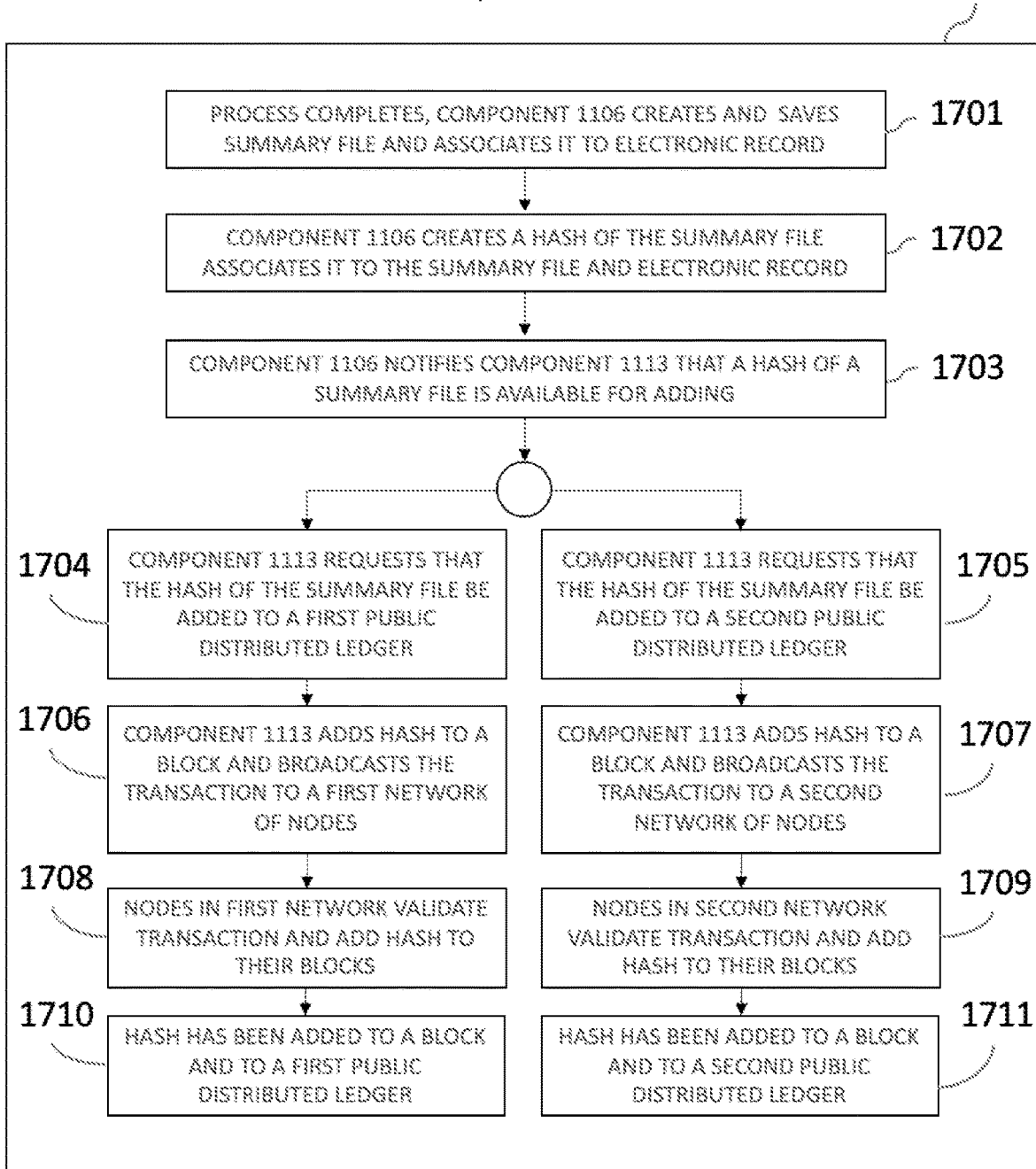

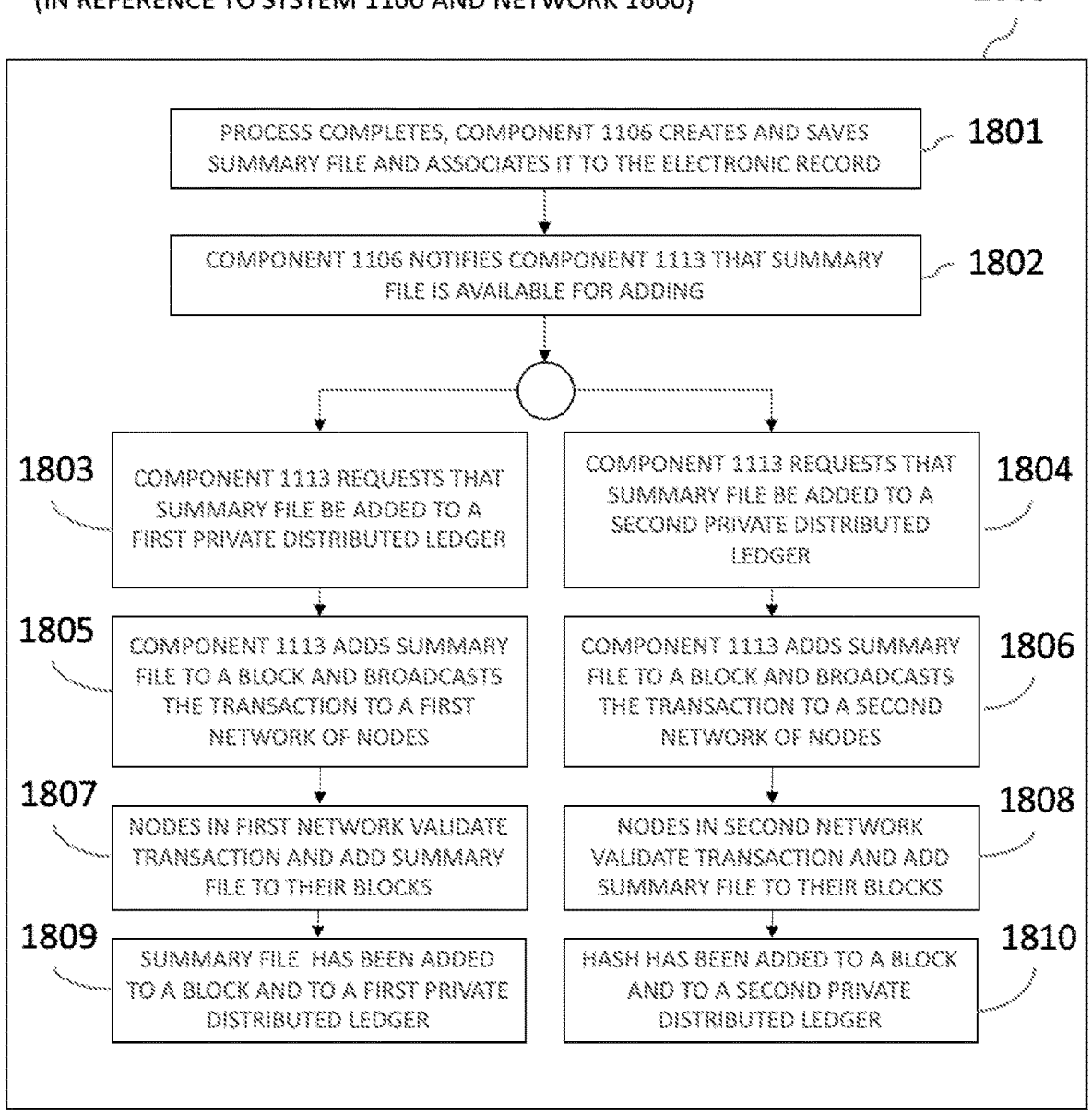

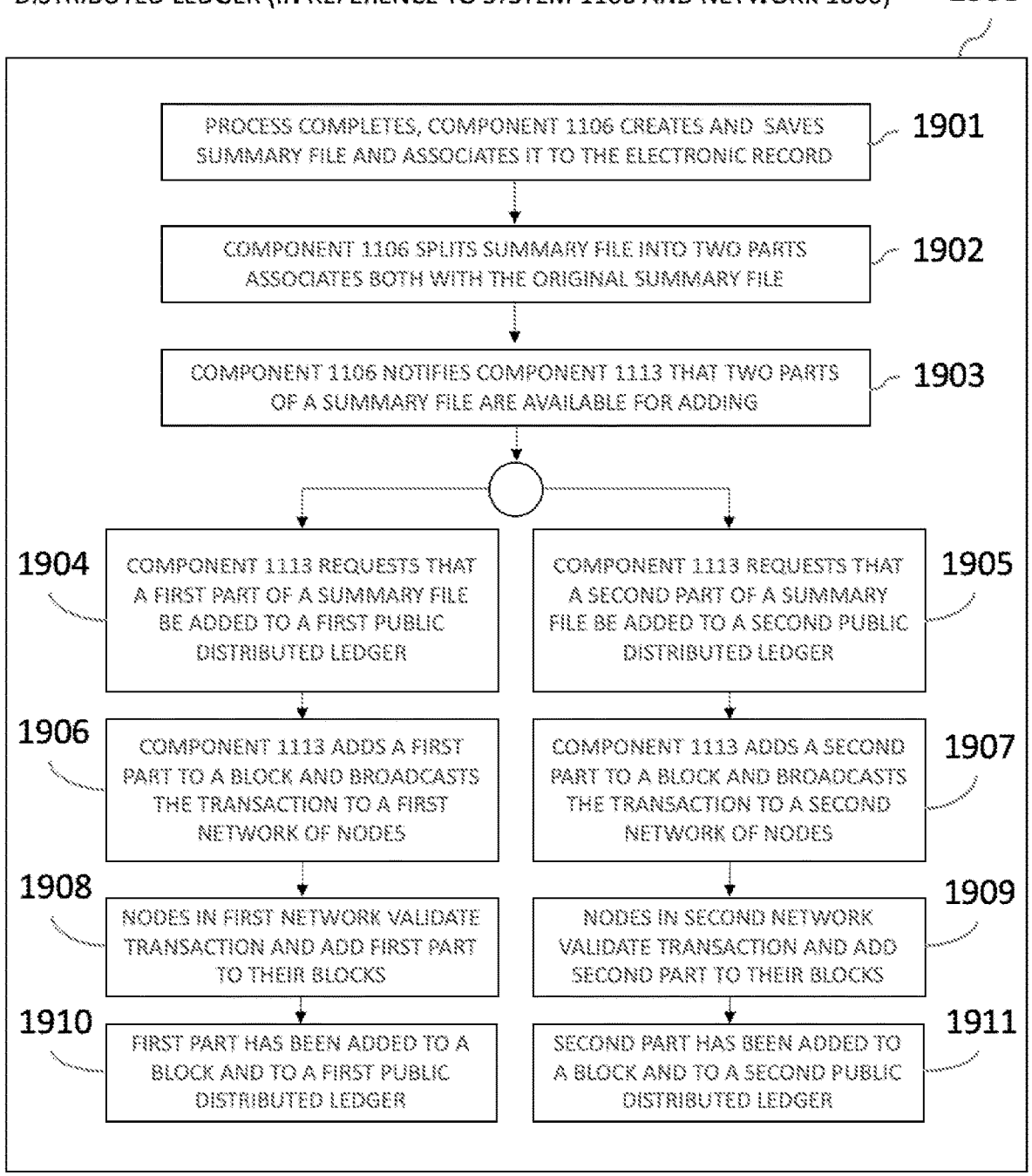

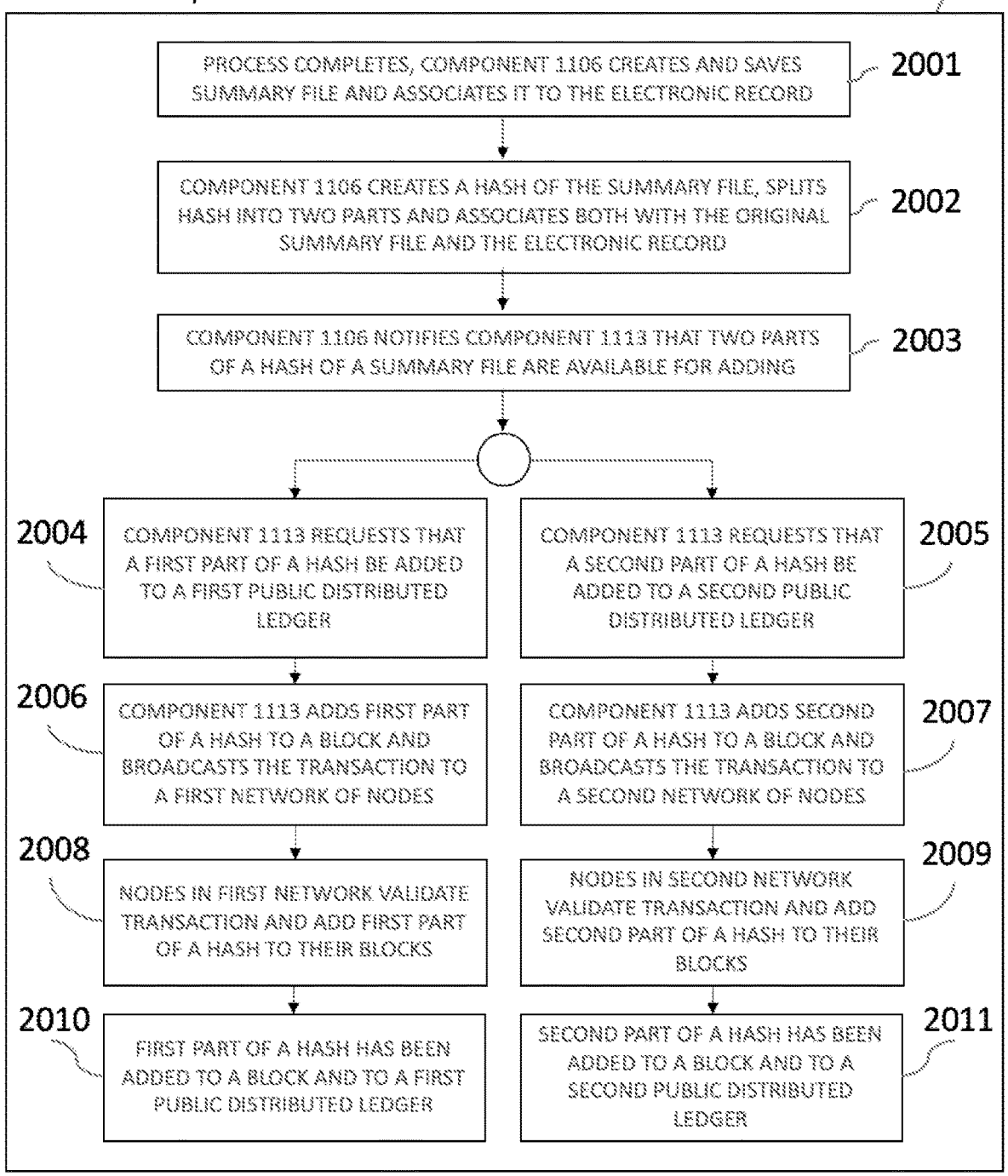

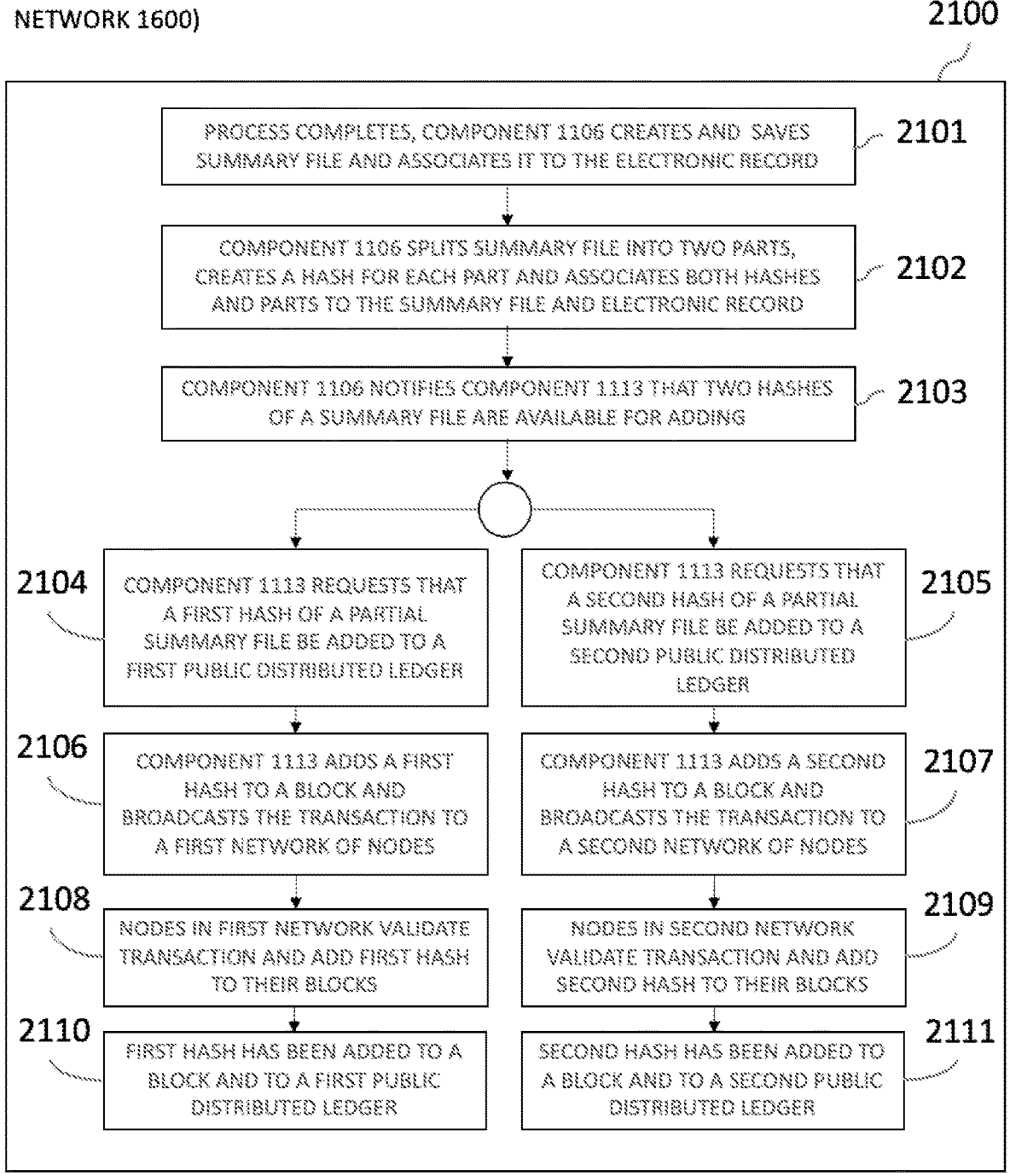

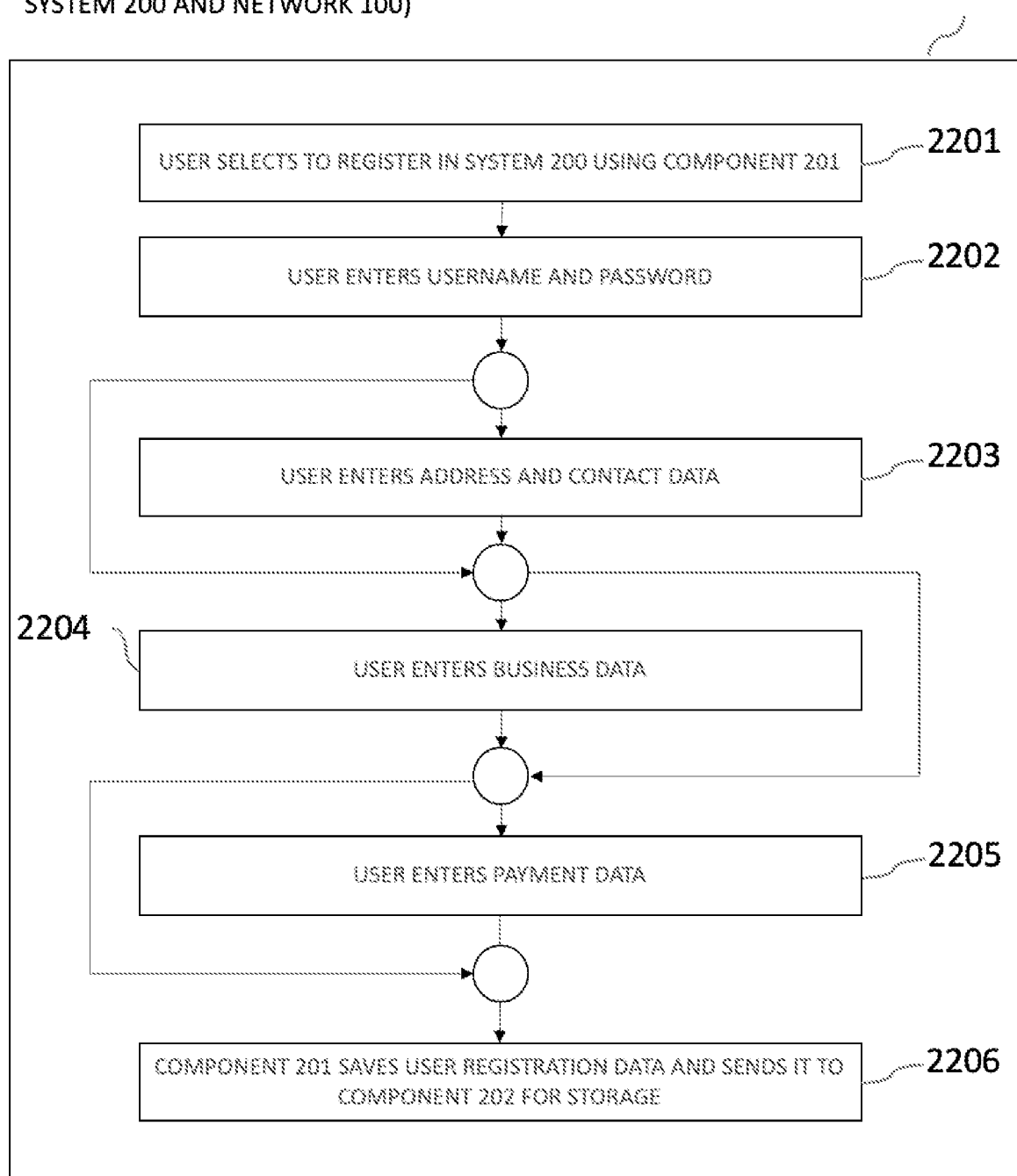

SYSTEMS FOR MULTI-PARTY DASHBOARDS

This application is a 371 National Stage application of International Application No. PCT/US2020/043550, filed Jul. 24, 2020, which claims the benefit of U.S. Provisional Application No. 62/879,416, filed Jul. 27, 2019, and U.S. Provisional Application No. 62/886,920, filed Aug. 14, 2019, each of which are hereby incorporated by reference in their entirety.

BACKGROUND ART

The inventor of the present invention has recognized problems unaddressed in the art regarding the sharing of event data and documents as electronic records of processes regarding all activities in a business such as a manufacturing facility, an office or a warehouse. An event is the occurrence of a state and specifically the state of a person or an object relevant to the execution of a process. For example, the "arrival of a transportation vehicle" at a warehouse location, the "completion of a certain number of products" at a manufacturing site, or the "on-time delivery of materials" to a manufacturing location are events. Documents comprise a wide variety of artefacts including, but not limited to, printed documents, electronic documents, image files, or video files. For example, a "bill of lading", "commercial invoice", "special handling instruction", "standard operating procedure", "signature capture" or "photo of a loading transaction" are supply chain documents. Processes generate a wealth of data in regard to events and require a wealth of documents that are often not widely shared among different parties involved in the execution of processes. Equally important, a lot of valuable event data is not shared at all. For example, specific event data may be known to personnel involved in the execution of a process, but it may never be properly documented or shared. Individual actors may not have a motivation to share this data, especially when exceptions occur such as a missed production quota or a late delivery. Further, event data and documents typically reside in central databases that may be owned and operated by one of the parties involved in the execution of a process with no or very limited access for all other involved parties. Still further, system interfaces that would allow wider sharing of event data and documents between two or more central databases or systems are often prohibitively expensive, especially between parties that do not transact business with one another on a regular basis. Moreover, when event data or documents are shared, there is seldom certainty about the validity or completeness of the event data or documents that are being shared. In current processes, it is possible that only partial or wrong event data or documents are shared. When event data, documents, or processes change after data or documents have been shared, there are no guarantees that these updates are shared as well. It is also possible for a party involved in the execution of a process to change or delete event data or documents after the fact. What is needed therefore are systems and methods for the creation, sharing and updating of electronic records containing event data and documents relevant for the operation and execution of processes.

SUMMARY OF INVENTION

These and other problems in the art are overcome by systems and related methods for the creation, sharing, updating and storage of electronic records containing event data and documents relevant to the execution of processes. Event data comprises of the occurrence of a state and specifically the state of a person or an object relevant to the execution of a process. For example, a transportation vehicle may need to be loaded with freight. The "arrival time" of the transportation vehicle, the "proper handling and loading" of the freight or the "securing of freight on a trailer" are examples of supply chain events. Documents comprise a wide variety of artefacts including, but not limited to, printed documents, electronic documents, image files, or video files. For example, a "bill of lading", "commercial invoice", "special handling instruction", "standard operating procedure", "signature capture" or "photo of a loading transaction" are supply chain documents. The present invention disclosure uses examples from supply chain operations to illustrate principles concerning the present invention but is not limited to the area of supply chain management.

The present invention allows for creation, sharing, updating and storage of event data and documents in regard to the execution of a process. When documents are created or events occur, data describing them or whole documents can be attached to an electronic record of a process. Processes may include, but are not limited to, the transport of freight from one point to another, the storing of materials in a warehouse, the production of products in a manufacturing facility, or the provision of supply chain services such as packaging, kitting or assembly. The present invention describes systems and related methods that allow the sharing of event data and documents between different parties. For example, one party may set up a process or transaction on a dashboard and then invite other parties to view the process or transaction, to edit data about the process or transaction and to add additional event data or documents. Parties that share a transaction or a process on a dashboard may include, but are not limited to, organizations that are directly involved in the execution of the process and parties that may have an interest in monitoring the execution of the process. When event data or documents are updated, all parties invited to view an electronic record of the execution of a transaction or process may view these changes. Some embodiments of the present invention use distributed ledger technology. A distributed ledger is an immutable record system in the sense that it is cryptographically hard to change event data or documents once they have been stored on the distributed ledger. Documents or event data may be stored on a distributed ledger in a variety of ways including, but not limited to, their native format (original data and documents), in an abstracted format or in an encrypted format. Event data and documents that have been recorded on a distributed ledger can be audited by all parties with access to the distributed ledger. For example, third-parties not directly involved in the execution of a supply chain process including, but not limited to, factoring businesses, money lenders, banks or insurance companies have the ability to obtain validated data from a distributed ledger that may be used to establish credit or assess the viability of an insurance claim that may rest on data about processes, events or documents. Further, when event data and documents are stored on a distributed ledger, it leads to a built-in redundancy and higher resiliency of the overall system. Still further, it is conceivable that future information systems such as enterprise resource planning (ERP), warehouse management systems (WMS) or transportation management systems (TMS) may rely on distributed ledger technology as well. When that occurs, data and documents may be exchanged between different systems as long as they have access to the same distributed ledger or employ interoperability mechanisms such as data standards that allow a multitude of diverse distributed ledger technologies to leverage the data and documents. In some embodiments of the present invention, it is conceivable that payments may be processed very efficiently through the use of distributed ledger and smart contract technology.

For the purposes of describing the present invention, examples from supply chain management and manufacturing are often used. Reference to "supply chain event data" or "manufacturing event data" will simply referred to as "event data", reference to "supply chain events" or "manufacturing events" will simply be referred to as "events", reference to "supply chain documents" or "manufacturing documents" will simply referred to as "documents" and reference to "supply chain processes" or "manufacturing processes" will simply be referred to as "processes" unless explicitly stated otherwise. This also reflects that the present invention applies to all areas of business, management, communication and coordination and is no way limited to supply chain management or manufacturing. For purposes of describing the present invention terms such as "partner", "operator", "user" or "observer" all refer to users of the system. They are sometimes used for clarity in that a user is a person or machine that operates or interacts with the systems described by the present invention and can be in various embodiments of the present invention an operator, a partner, a user or an observer. The system is shown comprising a number of data storage components, however in certain embodiments a single data storage component may be used while in other embodiments a plurality of data storage components may be used.

The present disclosure provides a system for creating, sharing and updating an electronic record of a process, the system comprising: (a) a registration component to register a first user if the first user is unknown to the system or recognize the first user if the first user is known to the system and permit the first user to access the system after registration or recognition, (b) a registration data management component for storing registration information of the first user, (c) an electronic record management component for creating an electronic record; the first user creating the electronic record comprising a first record identifier and a first data element, (d) an invitation component, the invitation component allowing the first user to invite a second user to access the system, the registration component registering the second user if the second user is unknown to the system or recognizing the second user if the second user is known to the system and allowing the second user to have access to the electronic record after registration or recognition, and the registration data management component storing registration information of the second user, and (e) an operator invite component for the first user or the second user to invite an operator to access the system, the registration component registering the operator if the operator is unknown to the system or recognizing the operator if the operator is known to the system and allowing the operator to have access to the electronic record after registration or recognition, and the registration data management component storing registration information of the operator.

In certain embodiments the first or second user or the operator utilizes the electronic record management component to update the electronic record by adding a second data element to the electronic record. It will be understood that the same steps can be used to add any number of additional data elements.

In one embodiment the first user, the second user or the operator utilizes the invitation component to invite a third user to access the system, the registration component registering the third user if the third user is unknown to the system or recognizing the third user if the third user is known to the system and allowing the third user to have access to the electronic record after registration or recognition and the registration data management component storing registration information of the third user.

In further embodiments the first, second or third user or the operator utilizes the electronic record management component to update the electronic record by adding a second data element to the electronic record.

In particular embodiments the first user, the second user, the third user or the operator utilizes the invitation component to invite a fourth user to access the system, the registration component registering the fourth user if the fourth user is unknown to the system or recognizing the fourth user if the fourth user is known to the system and allowing the fourth user to have access to the electronic record after registration or recognition and the registration data management component storing registration information of the fourth user. One will understand that the same steps will be used for any number of additional users.

In other embodiments the electronic record is created manually.

In yet other embodiments the electronic record is created automatically.

In certain embodiments the system further comprises a storage component for storing the electronic record.

In further embodiments the system further comprises an external data source access component for accessing and storing external data.

In yet further embodiments the system further comprises an external data source storage component for storing external data.

In particular embodiments the system further comprises a summary file comprising all of the data elements of the electronic record.

The present disclosure also provides a system for creating, sharing and updating an electronic record of a process, the system comprising: (a) a registration component to register a first user if the first user is unknown to the system or recognize the first user if the first user is known to the system and permit the first user to access the system after registration or recognition, (b) a registration data management component for storing registration information of the first user, (c) an electronic record management component for creating an electronic record; the first user creating the electronic record comprising a first record identifier and a first data element, (d) an invitation component, the invitation component allowing the first user to invite a second user to access the system, the registration component registering the second user if the second user is unknown to the system or recognizing the second user if the second user is known to the system and allowing the second user to have access to the electronic record after registration or recognition, and the registration data management component storing registration information of the second user, (e) an operator invite component for the first user or the second user to invite an operator to access the system, the registration component registering the operator if the operator is unknown to the system or recognizing the operator if the operator is known to the system and allowing the operator to have access to the electronic record after registration or recognition, and the registration data management component storing registration information of the operator, and (f) a distributed ledger connector component for connecting the system to a first distributed ledger.

In one embodiment the first or second user or the operator utilizes the electronic record management component to update the electronic record by adding a second data element to the electronic record.

In some embodiments the first user, the second user or the operator utilizes the invitation component to invite a third user to access the system, the registration component registering the third user if the third user is unknown to the system or recognizing the third user if the third user is known to the system and allowing the third user to have access to the electronic record after registration or recognition and the registration data management component storing registration information of the third user.

In other embodiments the first, second or third user or the operator utilizes the electronic record management component to update the electronic record by adding a second data element to the electronic record.

In further embodiments the first user, the second user, the third user or the operator utilizes the invitation component to invite a fourth user to access the system, the registration component registering the fourth user if the fourth user is unknown to the system or recognizing the fourth user if the fourth user is known to the system and allowing the fourth user to have access to the electronic record after registration or recognition and the registration data management component storing registration information of the fourth user.

In yet further embodiments the electronic record is created manually.

In particular embodiments the electronic record is created automatically.

In certain embodiments the system further comprises a storage component for storing the electronic record.

In further embodiments the system further comprises an external data source access component for accessing and storing external data.

In other embodiments the system further comprises an external data source storage component for storing external data.

In certain embodiments the system further comprises a summary file comprising all of the data elements of the electronic record.

In other embodiments the distributed ledger connector component adds the electronic record to a first block and broadcasts the first block to a plurality of nodes of the first distributed ledger to validate and store the first block on the first distributed ledger.

In further embodiments the electronic record management component calculates a hash value of the electronic record, the distributed ledger connector component sends the hash value to the first distributed ledger and adds the hash value to a second block and broadcasts the second block to the plurality of nodes of the first distributed ledger to validate and store the second block on the first distributed ledger. One understands that in addition to hashes other forms of data abstraction may be used as well.

In still further embodiments the distributed ledger connector component connects the system to a first distributed ledger and a second distributed ledger.

In yet further embodiments the distributed ledger connector component adds the electronic record to a first block and broadcasts the first block to a plurality of nodes of the distributed ledger to validate and store the first block on the distributed ledger, and the distributed ledger connector component adds the electronic record to a second block and broadcasts the second block to a plurality of nodes of the second distributed ledger to validate and store the second block on the distributed ledger.

In other embodiments the electronic record management component calculates a hash value of the electronic record, the distributed ledger connector component sends the hash value to the first distributed ledger and adds the hash value to a third block and broadcasts the third block to the plurality of nodes of the first distributed ledger to validate and store the third block on the first distributed ledger, and the distributed ledger connector component sends the hash value to the second distributed ledger and adds the hash value to a fourth block and broadcasts the fourth block to the plurality of nodes of the second distributed ledger to validate and store the fourth block on the second distributed ledger.

In particular embodiments the electronic record management component calculates a hash value of the electronic record and splits the hash value into a first hash value part and a second hash value part, the distributed ledger connector component sends the first hash value part to the first distributed ledger and adds the first hash value part to a third block and broadcasts the third block to the plurality of nodes of the first distributed ledger to validate and store the third block on the first distributed ledger, and the distributed ledger connector component sends the second hash value part to the second distributed ledger and adds the second hash value part to a fourth block and broadcasts the fourth block to the plurality of nodes of the second distributed ledger to validate and store the fourth block on the second distributed ledger.

In other embodiments the electronic record management component splits the electronic record into a first electronic record part and a second electronic record part, the distributed ledger connector component adds the first electronic record part to a first block and broadcasts the first block to a plurality of nodes of the distributed ledger to validate and store the first block on the distributed ledger, and the distributed ledger connector component adds the second electronic record part to a second block and broadcasts the second block to a plurality of nodes of the second distributed ledger to validate and store the second block on the distributed ledger.

In some embodiments the electronic record management component calculates a first hash value of the first electronic record part, the distributed ledger connector component sends the first hash value to the first distributed ledger and adds the first hash value to a third block and broadcasts the third block to the plurality of nodes of the first distributed ledger to validate and store the third block on the first distributed ledger, and the electronic record management component calculates a second hash value of the second electronic record part, the distributed ledger connector component sends the second hash value to the second distributed ledger and adds the second hash value to a fourth block and broadcasts the fourth block to the plurality of nodes of the second distributed ledger to validate and store the fourth block on the second distributed ledger.

BRIEF DESCRIPTION OF DRAWINGS

Those of skill in the art will understand that the drawings, described below, are for illustrative purposes only. The drawings are not intended to limit the scope of the present teachings in any way.

FIG. 1 is a schematic of a network for data sharing in accordance with an exemplary embodiment;

FIG. 2 is a schematic of a system for data sharing in accordance with an exemplary embodiment utilizing FIG. 1;

FIG. 3 is a block diagram of a method of manually creating an electronic record of a process utilizing the network of FIG. 1 and the system of FIG. 2;

FIG. 4 is a block diagram of a method of automatically creating an electronic record of a process utilizing the network of FIG. 1 and the system of FIG. 2;

FIG. 5 is a block diagram of a method of inviting another user to share an electronic record of a process utilizing the network of FIG. 1 and the system of FIG. 2;

FIG. 6 is a block diagram of a method of sharing a document with another user utilizing the network of FIG. 1 and the system of FIG. 2

FIG. 7 is a block diagram of a method of sharing event data with another user utilizing the network of FIG. 1 and the system of FIG. 2;

FIG. 8 is a block diagram of a method of creating a summary file of an electronic record of a process utilizing the network of FIG. 1 and the system of FIG. 2;

FIG. 9 is a block diagram of a method of sharing event data and documents during the execution of a process utilizing the network of FIG. 1 and the system of FIG. 2;

FIG. 10 is a schematic of a network comprising a distributed ledger for supply chain data sharing in accordance with another exemplary embodiment;

FIG. 11 is a schematic of a system for supply chain data sharing comprising a distributed ledger in accordance with another exemplary embodiment utilizing FIG. 10;

FIG. 12 is a block diagram illustrating linking data blocks on a distributed ledger using hashes;

FIG. 13 is a block diagram of a method for storing a document in original format on a distributed ledger utilizing the network of FIG. 10 and the system of FIG. 11;

FIG. 14 is a block diagram of a method for storing a hash of a summary file on a distributed ledger utilizing the network of FIG. 10 and the system of FIG. 11;

FIG. 15 is a block diagram of a method for storing event data on a distributed ledger utilizing the network of FIG. 10 and the system of FIG. 11;

FIG. 16 is a schematic of a network for supply chain data sharing comprising two or more distributed ledgers in accordance with another exemplary embodiment;

FIG. 17 is a block diagram of a method for storing a hash of a summary file on two or more distributed ledgers utilizing the network of FIG. 16 and the system of FIG. 11;

FIG. 18 is a block diagram of a method for storing a summary file on two or more distributed ledgers utilizing the network of FIG. 16 and the system of FIG. 11;

FIG. 19 is a block diagram of a method for storing a partial summary file on a first distributed ledger and a partial summary file on a second distributed ledger utilizing the network of FIG. 16 and the system of FIG. 11;

FIG. 20 is a block diagram of a method for storing partial hash of a summary file on a first distributed ledger and partial hash of a summary file on a second distributed ledger utilizing the network of FIG. 16 and the system of FIG. 11;

FIG. 21 is a block diagram of a method for storing a hash of a partial summary file on a first distributed ledger and hash of a partial summary file on a second distributed ledger utilizing the network of FIG. 16 and the system of FIG. 11.

FIG. 22 is a block diagram of a method of registering a user in the system utilizing the network of FIG. 1 and the system of FIG. 2;

DESCRIPTION OF EMBODIMENTS

Systems and related methods for the creation, sharing, updating and storage of electronic records containing event data and documents relevant before, during or after the operation and execution of a process are presented herein. In some embodiments of the present invention, a system for the creation, sharing, updating and storage of an electronic record of a process may comprise a distributed ledger. A distributed ledger may include, but is not limited to, a Blockchain, Hashgraph or Directed Acyclic Graph.

A multitude of events and event data can be observed in every process. The present invention enables a user to share an electronic record of a process with a multitude of other parties such as partners and third parties involved in the execution of the process or interested in monitoring of the process. In some embodiments of the present invention, event data, documents or electronic records of a process may be written to a distributed ledger in the form of a hash or in their original form. In other embodiments of the present invention, data may be represented using encryption technology or other forms of abstraction.

A majority of examples used in this invention disclosure use event data that is generated by or related to the operation and execution of a process that may occur in the field of transportation, logistics or material movement. However, the present invention is not limited to the field of transportation, logistics or material movement and may apply equally to other fields in which events occur and event data may be generated including, but not limited to, operations for warehousing, cross-docks, manufacturing, assembly, picking, packing, shipping, quality inspection, testing and labs, retail, service provision, human resources, financials, insurance, rental and leasing, stock markets, logistics exchanges, agricultural, construction, refinery, mining and drilling, feed yards, hospitals, restaurants, food trucks, catering, hotels, cruise ships, hospitality, theme parks, passenger travel, airports, seaports, rail yards, switching yards, train stations, subway stations, bus terminals, waste management, maintenance or repair, installation, defense and military, law enforcement, document management, public or private entertainment, concerts, sporting events, motor or animal racing, museums, or pop-up stores. Operations during which event data is captured include, but are not limited to, private, for-profit, non-profit, commercial, government, non-government or military operations.

Event data may be captured during the use of supply chain assets such as a vehicle or material handling equipment which may include, but are not limited to, heavy trucks, light trucks, trailers, tankers, self-driving trailers, containers, self-driving containers, tanker trucks, delivery vans, step vans, maintenance vans, repair vans, installation vans, pickup trucks, tractors, agricultural vehicles, agricultural machines, lawn mowers, golf carts, container moving equipment, trailer moving equipment, robotic movers, cranes, construction equipment, drilling and mining equipment, oil and gas exploration equipment, forklifts, pallet jacks, robotic storage shelves, material pickers, buses, locomotives, rail cars, switching engines, specialty railroad equipment, passenger trains, commuter trains, subway trains, law enforcement vehicles, fire trucks, ambulances, first responder vehicles, passenger vehicles, taxis, ride sharing vehicles, airplanes, helicopters, drones, airborne passenger transport vehicles, motorcycles, scooters, boards, bicycles, boats, barges, container ships, tanker ships, cruise ships, sail boats, yachts, ferries, catamarans, personnel moving ships, landing crafts, hovercrafts, tug boats, or speed boats. Some or all of these vehicles may be operated manually by a human operator, semi-autonomously or fully autonomously without a human operator. Semi-autonomous or autonomous supply chain assets may be controlled by a human operator present in the asset or by a remote human operator.

Event data may be captured by means of a manual user entry or by means of an event data capture device or computer that can partially or fully capture event data automatically. Devices or computers that enable either manual, automated, or partially manual and partially automated capture of event data include, but not limited to, a smart watch, a wearable device, a medical or biometric device, a sensor or actuator, an Internet of Things device, a USB device, a phone, a pager or other wireless device, a barcode reader, a handheld RFID device, a stationary RFID device, an RTLS device, a BLE device, a GPS device, a lidar, a radar, a CPU, a GPU, a FPGA, a chip with an integrated circuit, an electronic logging device, a sensor, an actuator, a tablet computer, a desktop computer, a laptop computer, a data center computer, a data center server, an image capture device, a video capture device, a sound recording device, a device used for the operation of a supply chain asset, a device permanently attached to a supply chain asset, a device temporarily used during the operation of a supply chain asset, a device attached to a product or material, a device attached to a pallet or packaging, a device mounted to a building, a device positioned along a road, a public or private website, a public or private database, a device controlled by a third party, a computer controlled by a third-party, a computer controlled by a third party involved in or affected by the operation of a process, a satellite, a surveillance camera, or a drone. A computer may be located locally or remotely including, but not limited to, in a data center or a computer cloud. Data capture devices may communicate with one another through one of several means including, but not limited to, a connection using a wire or cable, a wireless connection using nearfield technologies, a wireless connection using cellular or satellite wireless networks, a wireless connection using proprietary wireless networks or a connection in which data is downloaded manually or automatically from one computer and then uploaded manually or automatically to another computer. In some embodiments of the present invention, data capture devices or computers may only capture event data. In other embodiments of the present invention, they may also format, process, analyze, display, share, or store event data as well.

Event data may be captured in formats including, but not limited to, textual, numerical, still image, video, graphical, abstracted, abbreviated, proprietary, or audible form. Event data may be obtained by way of collection mechanisms including, but not limited to, means employed by any device or computer listed above, manual or automated user entry or selection, automated software entry or selection, third-party systems by way of an interface, direct or indirect measurement, a trigger by another computer, or observation. Event data may further be obtained through means including, but not limited to, data previously stored on any device or computer listed above, data previously stored on any computer described in the present invention disclosure, manual or previously stored data entered by users, manual or previously stored user selections, rule-based or otherwise automated software inputs, data from artificial intelligence systems, data generated by machine learning algorithms, data from other computers used in the capture of events, data from computers comprising a distributed ledger, data from publicly available sources, data from private sources, or data from documents including, but not limited to, instructions for handling of a process, instructions for handling of materials, instructions for operating an asset, instructions for operating a machine, user manuals, certificates, warranties, or other documents related to the operation and execution of a process. Examples of events and event data are listed further below.

In some embodiments of the present invention, events may be captured by devices or computers that are temporarily attached to a supply chain asset or material. Examples of temporary devices or computers may include, but are not limited to, wireless sensors to measure conditions such as shock, acceleration, deceleration, temperature, humidity, physical location sensors, or hardware devices that temporarily monitor the operating conditions of the supply chain asset. Other temporary devices may include, but are not limited to, RFID tag readers, barcode readers, BLE devices, USB devices or other wireless devices that allow for the identification of items through the scan of a barcode or electronic tag. A temporary device or computer may be attached to materials being transported, to packaging materials, or to a supply chain asset. A temporary device or computer may communicate with any other computer described in the present invention in a multitude of ways including, but not limited to, through a computer network such as the Internet to which it may connect wirelessly or by means of a cable, or through other mechanisms to upload or download event data. Temporary devices may be used frequently in some embodiments of the present invention, especially when autonomous vehicles may be used for a multitude of purposes or for a multitude of people or freight movements. The data generated by temporary devices may be available immediately, or it may only become available after a period of time has passed.

In some embodiments of the present invention, event data may be captured and processed by external systems that are not directly controlled by parties who are involved in the execution of a process or transaction including, but not limited to, a security camera, a warehouse camera, a camera mounted on a material moving asset such as a pallet jack, operator gear, or forklift, a camera mounted on another supply chain asset, an RFID reader, or a variety of sensors. For example, a camera mounted to the outside of the loading dock of an adjacent facility to a pick-up location may capture the license plate of a supply chain asset to identify the supply chain asset and then send an alert to the system described in the present invention disclosure so that all parties involved in the transaction may be notified that the supply chain asset has arrived at the pick-up location loading dock.

Events that occur during a process and the resulting event data include, but are not limited to, a date, a time, a physical location, a supply chain asset, a supply chain asset owner, a supply chain asset operator, a device, a computer, a material, a freight, a warehouse, a cross-dock, a yard, a storage location, a facility, a manufacturing plant, a depot, a retail location, a home base, a repair location, a plan or planning process, a user name, a password, a temporary password, a cryptographic public key, a cryptographic private key, a hash, a third-party operator, a location, a device, a customer, a retailer, a wholesaler, a distributor, a shipper, a carrier, a case, a process, an origin location, a midway point, a destination, a route, a tracking process, an identifier designated by a third-party system, a traffic condition, a road condition, a road hazard, road construction, a type of road, a light condition, an atmospheric condition, a facility condition, a location of a supply chain asset, a location along a route, an alert about an exception condition, a travel time, a dwell time, a delay, an accident, an estimated departure time, an estimated arrival time, a loading capacity, weight of loaded freight on a supply chain asset, dimensions of a supply chain asset, a hazardous material classification, instructions for handling of a hazardous material, a weather condition, a temperature condition, a barometric condition, measurement of a shock, measurement of an impact, measurements taken directly from a supply chain asset, an operating condition of a supply chain asset, a breakdown, a need for repair, a need for maintenance, an application of brakes, an application of acceleration, an obstacle, a breakdown in wireless communication, establishment of wireless communication, one or more results of actions taken by an operator, establishment of a route, a change in a route, a sensor reading, an image capture, a satellite image, a video, a purchase order, a sales order, a transportation order, a shipping order, a packing list, a bill of materials, a delivery note, a waybill, an air waybill, a bill of lading, a CMR document, a multimodal bill of lading, a cargo insurance certificate, a commercial invoice, an international commercial invoice, an international proforma invoice, an international purchase order, a general conditions of international sale document, an ATA carnet, a carnet, a certificate of origin, a certificate of inspection, an inspection by a customs officer, an acceptance of freight by a customs officer, a rejection of freight by a customs officer, a certificate of analysis, a phytosanitary document, a kosher certificate, a halal certificate, a manifest, a transport order, presence of a material, absence of a material, presence of an operator or passenger, absence of an operator or passenger, a change in freight, absence of a change in freight, a payment receipt, absence of a payment receipt, loading of freight, time to load freight, securing of freight, capture of an image of freight, dwell time at a warehouse or dock, charges for excessive dwell time at a warehouse or dock, staging of freight prior to loading, absence of freight staging prior to loading, availability of human operators during loading, a freight condition at origin, presence of freight securing devices at origin, absence of freight securing devices at origin, handling instructions for freight securing, freight pickup completion, a freight condition at points along a route, duration of a transport process, a delay in freight delivery, damages to freight during shipment, proximity to a destination, distance from a destination, time to reach a destination, sequence of multi-stop deliveries, closeness of multi-stop delivery points, freight shipment completion, freight condition at destination, dwell time at destination, unloading of freight, time to unload freight at a destination, condition of freight securing devices at destination, freight drop-off completion, a freight theft, a freight damage, availability of human operators during unloading, results of quality inspections, time to return to an origin location, time to return to a home base location, time to a second or following pick-up location, distance to a second or following pick-up location, time to a second or following drop-off location, distance to a second or following drop-off location, condition of a manufacturing asset, condition of a freight moving or supply chain asset, an inventory, an inventory location, availability of a material in inventory, an inventory dwell time, a container location, a container dwell time, a trailer location, a trailer dwell time, a FIFO sequence, a LIFO sequence, a restocking sequence, a restocking signal or alert, a quality inspection result, a quality inspection trigger, a staging location, a staging process completion signal, a staging process incomplete signal, a human operator availability during freight staging, a process operator or its identifier, operator certifications and permits, supply chain asset permits, a hazardous material permit, a hazardous material certification for an operator, material inventory on a supply chain asset, tool availability on a supply chain asset, parts or tools inventory at an installation or maintenance location, proximity to an installation or maintenance point, distance from an installation or maintenance location, time to reach an installation or maintenance location, time to return to a depot or base location, sequence of multi-stop installation or maintenance operations, dwell time at an installation or maintenance location, closeness of multi-stop installation or maintenance locations, a physical storage location of materials, a condition of a manufacturing asset, demand for materials in specific markets and geographies, availability of materials in geographic locations, price of a material, public holidays, employee vacation, employee sickness, employee absence, employee licenses and certifications, employee health status, employee permits to enter specific locations, a certificate to operate supply chain asset, a drivers license, a commercial drivers license, financial payments, a factoring invoice, receipts of financial payments, terms of payment, payment delays, immediate payments, discounts and bonuses, motivational incentives, points to complete a process, transaction, activity or task, availability of other contractual agreements, a fuel condition, an energy condition, availability of fuel or energy, location of a refueling or charging point, a regulatory mandate, a law or ordinance, completion of a process, non-completion of a process, availability of documents relevant to the operation of a process, availability of computers relevant to the operation of a process, or availability of human or machine operators monitoring the operation of a process. In some embodiments of the present invention, the above data may be captured in its original form. In other embodiments of the present invention, the above data may be represented by an identifier or through abbreviation or abstraction. Some events and event data are the result of processes performed by supply chain assets or operators engaged during the operation and execution of a supply chain process while other events and event data are external occurrences and out of the control of a human or machine operator, a business or a third party. The absence of an event completion including, but not limited to, unfinished event data inputs, disrupted event data inputs, incorrect event data inputs, or missing event data inputs may be considered event data in its own right for the purposes of the present invention disclosure. The absence of documents including, but not limited to, empty documents, incomplete documents, corrupted document files, incorrect documents, or missing documents may be considered event data in its own right for the purposes of the present invention disclosure.

The sharing and updating of event data and documents is an important part of the present invention. When exceptions from expected values for event data or documents occur, any computer used by the present invention may create and send an alert about an exception condition to any other computer or to users of external systems. Exception alerts may be treated as event data for the purposes of the present invention disclosure and, in some embodiments of the present invention, they may be written to a distributed ledger in the same way as any other event data. Further applying the principle, when any computer shown in the present invention disclosure determines that a different course of action from an initial course of action may be necessary, it may create and send an alert about a change in the course of action to any other computer or to users of external computers. Alerts about a change in a course of action may be treated as event data for the purposes of the present invention disclosure and, in some embodiments of the present invention, they may be written to a distributed ledger in the same way as any other event data.

Materials or freight may include, but are not limited to, raw materials, parts, consumables, work-in-progress materials, manufacturing assets, packaging, freight securing devices, pallets or crates, containers, written documents such as manuals or instructions, or finished goods or products. Materials may have a physical form generally as a gas, liquid or solid or they may not have a physical form including, but not limited to, software or data.

Supply chain assets and devices that capture, format or process event data or create or enhance documents may be used in a variety of processes. A supply chain process is a business process, or transaction, which comprises a series of activities or tasks comprising of people, machines, materials, skills, and knowledge to achieve an aim or objective. For the purposes of the present invention disclosure, we refer to a process as a class of transactions, for example "loading of freight" or "unloading of freight," and to transactions as an instance of a process, for example the "loading of freight on a given day in a specific location". In some embodiments of the present invention, a process may comprise of many transactions and many transactions may all be instances of a single process. In other embodiments of the present invention disclosure, a process may only comprise of one transaction. Processes may generate events and event data or are affected by events and event data. For example, the outcome of a process, transaction, activity or task is one or more event or event data. Often, an event resulting from activities performed in one process or transaction serves as a basis for how activities in another process or transaction are performed. A simple example may be that when a material pickup by a truck is delayed at the material origin, the likelihood of a delay in the material delivery at a destination increases greatly. Supply chain processes may generate or enhance documents or are affected by documents. For example, the arrival and departure times of a supply chain asset at a location may be recorded in one or more documents.

A process may comprise a multitude of events that may occur in a sequence or in parallel. Events comprise of the occurrence of a state and are documented through event data. When an event occurs, the resulting event data is captured by one or more devices or computers. An important aspect of how a process and an event are related to one another is that a process typically begins with an event and ends with an event. For example, a shipper may have freight that needs to be moved. The shipper may determine a route, a day and time, availability of a supply chain asset, etc. in order to begin the process of transporting the freight. The initial steps of setting up a plan are considered a course of action within the present invention disclosure. The first event and resulting event data in this process may be to set a course of action including, but not limited to, determining a pickup time, determining a drop off time, determining a transit time, determining a loading time, identifying special handling instructions, and so on. This course of action is then communicated to other participants in the transaction so that they can plan how to operate later processes. At different stages during the operation of a process, events, event data and documents may be used to monitor whether the course of action is still attainable or whether a change in the course of action is necessary. Delays of a supply chain asset for example due to problems in loading, traffic or extreme weather conditions, delays during unloading, etc. may lead to a change in the initial course of action.

A supply chain is a series of processes comprising of people, machines, materials, skills, and knowledge that transform one or more raw materials into one or more finished products, which includes the transport of materials and goods from one point to another until they reach a final consumer location. For example, processes include, but are not limited to, inbound transportation of materials, manufacturing, warehousing, outbound shipping, placement of product in customer locations, maintenance sites or installation sites, maintenance of materials after installation and also the return of products from customers back to retailers, distributors, wholesalers, or manufacturers. Further examples of supply chain processes include, but are not limited to, loading of materials onto supply chain assets, storing of materials, counting and inspecting of materials, counting materials in storage, quality inspections, repair or replacement of defective materials, replenishment of missing materials, exchange of older materials for newer ones, taking of materials out of storage, audits, collection of metrics regarding cost, time, quality, quantity or other attributes of processes or materials, planning of manufacturing processes, execution of a manufacturing process, marketing and sales promotions, advertising, sponsorship or social media campaigns, employee training and education, labor disputes or strikes, or unloading of materials at a destination.

In some embodiments of the present invention, the execution of a process documented through the capture, sharing, updating and storage of event data and documents in an electronic record may yield metrics describing the performance of a supply chain asset, an operator, a party directly involved in the operation and execution of a process, a party not directly involved in the operation and execution of a process, or other aspects of the supply chain process itself. Metrics may serve as a basis for operational decision-making by human or machine operators of any of the computers described in the present invention. Metrics may be displayed to human or machine operators in formats including, but not limited to, textual, numerical, abstracted, abbreviated, compressed, or graphical form. Examples of metrics include, but are not limited to, operator work hours, drive times, dwell times, supply chain asset utilization, warehouse efficiency, depot efficiency, retail location efficiency, fuel efficiency, route efficiency, travel time, toll charges, fee charges, insurance premiums, accident conditions, insurance payments, freight per customer metrics, freight per mile metrics, cost per mile metrics, weather influences on supply chain assets, efficiency by freight type, efficiency by trailer type, efficiency by process, efficiency by transport type, efficiency by distance to destination, efficiency in less-than-truckload operations, efficiency in last mile operations, efficiency in sea port deliveries and pickups, efficiency in airport deliveries and pickups, efficiency in parcel delivery, maintenance and repair efficiency, or the efficiency of a system to store event data on a distributed ledger. Any computer used by the present invention may collect, process, share or use metrics as described above.

In some embodiments of the present invention external data sources may be used to obtain data that adds meaning during the interpretation and analysis of event data. In other embodiments of the present invention, external data sources may be used to obtain event data or documents that are then attached to an electronic record of a process. In yet other embodiments of the present invention, external data sources may be used to create an electronic record of a process. External data sources may include, but are not limited to, an enterprise resource planning system (ERP), a customer data system, a supplier system, a business partner system, a transportation management system (TMS), a route management system, a freight forwarding system, a freight brokerage system, a warehouse management system (WMS), a global trade management system, a financial system, a banking system, a credit card processing system, an online sales system, a sales support system, a customer relationship management system (CRM), a supplier relationship management system (SRM), a human resource management system, a time and attendance system, an online database, a system containing publicly available data, a system containing private data, a system containing confidential data, a system containing military data, or a system containing government data.

In some embodiments of the present invention, a supply chain asset may be an autonomous vehicle or autonomous material movement equipment. An autonomous supply chain asset may operate fully autonomously, partially autonomously or fully manually with a human operator. One or more autonomous supply chain assets may be locally or remotely monitored by a human or machine operator. Examples of autonomous material movement equipment include, but are not limited to, autonomous forklifts, autonomous shelves, computer-controlled conveyor belts, autonomous drones, or other robotic equipment.

In some embodiments of the present invention, a system for the creation, sharing, updating and storage of electronic records containing data, event data and documents relevant for the operation and execution of a process may comprise a distributed ledger. Types of distributed ledgers include, but are not limited to, a Blockchain, Hashgraph or Directed Acyclic Graph, which may be public or private. A permissioned distributed ledger is generally a type of a private distributed ledger but can be a public distributed ledger in some embodiments of the present invention. A distributed ledger may have two or more nodes in a network of nodes. In some embodiments of the present invention, it is conceivable that a distributed ledger may only have one node. A distributed ledger may reside on one or more computers. A node of a distributed ledger may reside on one or more computers. A computer may host one or more distributed ledgers. A distributed ledger may reside on any of the computers discussed in this invention disclosure.

Referring to FIG. 1, a network for the creation, sharing, updating and storage of an electronic record in regard to the execution of a process is shown. Network 100 comprises several computers including the system described by one embodiment of the present invention disclosure (101, 200), a network for data sharing (102), operator computers (103), partner computers (104) and external data sources (105).

Element 101 (System 200) shows a system for the creation, sharing, updating and storage of electronic records of a process. Element 101 allows users to register, create, share and display electronic records of a process, to upload documents and update data contained in an electronic record, to create a summary file of an electronic record and to store an electronic record of a process. Element 101 is described in detail in FIG. 2. FIG. 1 should not imply that Network 100 requires precisely one electronic record system for processes (101) or is limited to a specific number of electronic record systems for processes (101).

Element 102 shows the network by which computers may share data with each other. Forms of networks may include, but are not limited to, the public Internet, a private network, a government network or other networks intended to share data between computers that may or may not be directly connected to one another. Elements listed in Network 100 may connect to the network (102) through a variety of means including, but not limited to, local area wireless communication, wide area wireless communication, satellite wireless communication, cables or by way of data uploads and downloads that may be handled manually or automatically.

Element 103 shows an operator computer used by a person or machine to access an electronic record of a process. An operator computer receives event data and documents from system 101 and collects event data and documents during the execution of a process, which it sends back to system 101 so that an electronic record of a process may be updated. Examples of operator computers include, but are not limited to, smartphones, tablet computers, laptop computers or other hardware devices used during the operation of a process. FIG. 1 should not imply that Network 100 requires precisely one operator computer (103) or is limited to a specific number of operator computers (103).

Element 104 shows a partner computer used by a person or machine to participate in the sharing and updating of an electronic record containing event data and documents during the execution of a process. A partner computer may be granted access to an electronic record created, shared, updated and stored in system 101. A partner computer may also generate event data and documents used by system 101 to update an electronic record for the execution of a process. FIG. 1 should not imply that Network 100 requires precisely one partner computer (104) or is limited to a specific number of partner computers (104).

Element 105 shows external data sources used to obtain data about a process, event data or documents regarding the execution of a process. In some embodiments of the present invention, external data sources may be systems that can provide data used in the creation of an electronic record of a process such as from an Enterprise Resource Planning (ERP) system or Transportation Management System (TMS). In other embodiments of the present invention, external data sources may be websites or databases that contain information relevant to the execution of a process. In still further embodiments of the present invention, electronic record data, event data, documents, summary files of an electronic record, electronic records of a process or user credentials may be sent to an external data source (105) using Component 209. FIG. 1 should not imply that Network 100 requires precisely one external data source (105) or is limited to a specific number of external data sources (105).

Sharing of event data between two or more of the computers in Network 100 occurs by means of communication. Data formats used in communication may include, but are not limited to, native, proprietary, textual, numerical, image, video, audio, abbreviation, abstraction, compression, hash, or encrypted form. Event data or documents may be sent from one Element to any other Element in the format in which they were captured or received, or in a different format from the one in which they were captured or received. Communication between two or more computers in Network 100 may be unsecured or secured. Secured communication may include, but is not limited to, the use of authentication of users prior to the display of event data or documents, the use of encryption for event data or documents during the sending and receiving, the use of private and public keys, the use of secure socket layers, or the use of a virtual private network.

In some embodiments of the present invention, Elements in Network 100 may display electronic record, event data or documents in graphical form, numerical or textual form, on a map, or as a performance metric to a user.

In other embodiments of the present invention, Elements in Network 100 may be located on or embedded in a supply chain asset. For example, a supply chain asset may integrate Element 103 into its own computing systems and devices that are used for the capture and processing of event data may be connected to the supply chain asset as well. A practical example may be that Element 103 may be part of an on-board computer of an autonomous vehicle, which also connects to a variety of sensors including, but not limited to, cameras, operational vehicle sensors, GPS sensors, weight sensors, temperature sensors, or light sensors.

Referring to FIG. 2, one embodiment of the present invention comprising a system for the creation, sharing, updating and storage of an electronic record of a process is shown. System 200 comprises of twelve components used in the creation, sharing, updating and storage of an electronic record of a process.

Component 201 allows users and partners to register in System 200. User or partner credentials collected during registration may include, but are not limited to, a username and password. In some embodiments of the present invention user or partner credentials may also include biometric data including, but not limited to, a fingerprint, retina image, a voice frequency, a gait, a facial image, a user location, a DNA marker, or any combination thereof. In some embodiments of the present invention, users or partners may enter additional data, for example a company name, a company identifier such as a tax number, a business location, an email address, a phone number, or an answer to a security question. In other embodiments of the present invention, users or partners may enter a payment method and preference for payment processing during registration. In some embodiments of the present invention, user or partner registration may include the sharing of orientation or training materials.

Component 202 allows System 200 to capture, store and manage data that is collected during the registration of users or partners or at later points in time. Component 202 also allows users or partners to access, change and save data about them. Further, Component 202 validates user credentials when they log into System 200.

Component 203 allows System 200 to register operators. Operator credentials collected during registration may include, but are not limited to, a username and password. In some embodiments of the present invention operator credentials may also include biometric data including, but not limited to, a fingerprint, retina image, a voice frequency, a gait, a facial image, a user location, a DNA marker, or any combination thereof. In some embodiments of the present invention, operators may enter additional data, for example a company name, a company identifier such as a tax number, a business location, an email address, a phone number, or an answer to a security question. In some embodiments of the present invention, operators may enter a payment method and preference for payment processing during registration. In some embodiments of the present invention, operator registration may include the sharing of user orientation or training materials.

Component 204 allows System 200 to capture, store and manage data that is collected during the registration of operators or at later points in time. Component 204 also allows operators to access, change and save data about them. Further, Component 204 validates operator credentials when they log into System 200 and, in some embodiments of the present invention, into System 300.

Component 205 enables System 200 to create an electronic record of a process. In one embodiment of the present invention, an electronic record of a process may be created manually by a person. In another embodiment of the present invention, an electronic record may be created through data import from an ERP system or TMS or from another external data source (105) using Component 209. In yet another embodiment of the present invention, an electronic record may be created through data import from a partner (104) or an operator (103) computer. An electronic record of a process comprises data about the process itself such as, at a minimum, a process name or identifier. In some embodiments of the present invention, an electronic record may contain additional data including, but is not limited to, one or more locations, one or more material descriptions, one or more lists of work steps, one or more lists of data capture tasks to be completed by an operator, or one or more instruction sets for operators relevant to the execution of a process.

Component 206 allows System 200 to process and store electronic records of a process. It further allows for the association of event data and documents to an electronic record of a process so that they can be displayed to users of System 200 along with the electronic record of a process. Component 206 further allows users of System 200 to update data in the electronic record itself or event data and documents associated with the electronic record of a process. When changes are made to the electronic record of a process, Component 206 processes those changes. For example, a partner may use a computer to upload a document to be associated with an electronic record of a process. Component 206 ensures that the document is associated to the correct electronic record and that it is displayed when users of System 200 select to view the electronic record. Component 206 further allows System 200 to create a summary file of an electronic record and to associate the summary file to the electronic record itself.

Component 207 processes and stores documents related to an electronic record of a process. In some embodiments of the present invention Component 207 may receive documents from Elements in network 100. In other embodiments of the present invention, Component 207 may create documents based on event data received from Component 208, from Elements of Network 100, or though user data inputs for example. A multitude of documents may be associated with an electronic record of a process. One of the benefits of System 200 is that when a document has been associated with an electronic record of a process, users of System 200 with authorization to access the document may be able to view them. In some embodiments of the present invention, documents may need to be further processed. For example, a user of System 200 may upload a document into a text processor format such as Microsoft Word. Component 207 may then process the document into a different file format such as Portable Document Format (PDF). In some embodiments of the present invention, a document may be displayed in its entire length. In other embodiments of the present invention, a document may be analyzed and summarized by a human or machine user of the system to only display a summary of the contents. In yet other embodiments of the present invention, a software such as an artificial intelligence or machine learning software may access and analyze a document to derive further insights.

Component 208 processes and stores event data related to an electronic record of a process. Component 208 may receive event data from Component 209 or from other Elements in network 100. One benefit is that when event data has been associated with an electronic record of a process, users of System 200 with authorization to access the event data are able to view it. In some embodiments of the present invention, event data may need to be further processed. For example, event data may be a location of a supply chain asset. It may be collected through an operator computer (103) and sent to System 200 in the form of latitude and longitude coordinates. In this case, Component 208 further processes the event data to establish and display a physical location in textual form or to display the physical location on a map. Another example may be that an operator may collect photographic images or video recordings or obtain a signature image during the execution of a process, which Element 103 for example sends to Component 208 so that they can be associated with the electronic record.

Component 209 allows System 200 to access data stored on other systems or databases such as an ERP or TMS or other sources of data as described herein in the present invention disclosure through an interface into external data sources (105). System 200 may receive external data from a variety of sources. For example, component 209 may obtain data from external data sources (105) using automated computer system interface mechanisms including, but not limited to, an EDI document, an application programming interface, an application binary interface, a file grabber, direct access to an external computer, or direct access to an external computer database. In some embodiments of the present invention, a user of System 200 may manually enter data obtained from an external data source (105) by mechanisms that include, but are not limited to, looking at an external system, receiving data in an email or similar message, receiving a data file on a storage device, or receiving data via communication with a user of an external computer.

Component 210 processes and stores data obtained from an external data source (105) that is associated to an electronic record of a process. In some embodiments of the present invention, external data may need to be further processed. For example, it may be beneficial to obtain traffic and weather data through an external data source (105) so that it may be associated to an electronic record of a process. Components in System 200 may request the data from an external data source (105) through Component 209 and may, for example, receive data about traffic and weather for a specific route of a supply chain asset. Component 210 compares the traffic and weather data to the route and current location of the supply chain asset in order to determine whether the supply chain asset may be affected by traffic or weather causing a delay along its route to reach a destination.

Component 211 handles user ("Partner") access rights to an electronic record of a process, to event data and documents, to summary files and other data including, but not limited to, user lists, address lists or contact lists. Only users who have been allowed access to an electronic record of a process are able to view or update it. In some embodiments of the present invention, not all users of System 200 may have access to all data contained in an electronic record of a process. Some event data or documents may only be appropriate to share with some, but not all users of System 200. For example, a manufacturer may operate System 200 and invite a third-party logistics provider (3PL) to view an electronic record of a process. The 3PL in turn may invite a freight broker to view the same electronic record of a process. The freight broker may invite a dispatcher to view the same electronic record of a process. The dispatch may invite an operator, in this case a truck driver, to execute the process. There may be commercial agreements between the manufacturer and 3PL that cannot be shared with any of the other partners. Likewise, the 3PL may have commercial agreements with a broker that cannot be shared with the manufacturer, dispatcher or operator and so on. Component 211 enables users to designate who may view specific electronic record data, event data or documents as part of an electronic record of a process. Another example, using the same case, may be that a dispatcher may not wish to disclose the identity of an operator to a freight broker, 3PL or manufacturer. Component 211 enables the dispatcher to select whether to share or not to share the identity of an operator.

Component 212 handles the addition of users ("Partners") to System 200 in the form of invites. Users may be invited to share and update an electronic record of a process in a multitude of ways. In one embodiment of the present invention, a first user of System 200 may invite a second user who may be a partner or an operator by way of providing a unique identification including, but not limited to, an email address, a phone number, a username or another form of unique identifier. Component 212 may then check whether an invited user has already been registered in System 200. In some embodiments of the present invention, if the user has previously registered in System 200, Component 212 may send an email or text message notification to the user that he has been invited to view the electronic record of a process by logging into System 200 using his user credentials. In other embodiments of the present invention, if the user has not previously registered to use System 200, Component 212 may send an email or a text message with instructions on how to register for System 200. Once the new user registers in System 200, he will be able to view the electronic record of a process. In other embodiments of the present invention, users who have been invited to view an electronic record of a process may in turn invite other users to view the same electronic record of a process. In further embodiments of the present invention, new users may be invited to view an electronic record of a process by way of selection. For example, System 200 may display a number of potential users or partners to a first user who has created an electronic record of a process. New users may be suggested to a first user based on specific criteria including, but not limited to, available capacity, geographic location or reputation. In still further embodiments of the present invention, a human or machine operator not associated with the user who created an initial electronic record of a process may determine which other users should be invited to share and update an electronic record of a process. In yet other embodiments of the present invention, a software program may determine which other users should be invited to share and update an electronic record of a process.

Referring to FIG. 22, shown is Block Diagram 2200 comprising a flow for one embodiment of the present invention allowing a user to register in reference to System 200 and Network 100. The flow shown in Block Diagram 2200 comprises of six steps and begins with step 2201 in which a user selects to register in System 200 using Component 201. In step 2202, the user enters a username and password. Not shown in Block Diagram 2200, a user may also select alternative means to authenticate users in System 200 which may include, but are not limited to, two-factor authentications, multi-factor authentications, the use of public and private keys, a fingerprint, retina image, a voice frequency, a gait, a facial image, a user location, a DNA marker, or any combination thereof. Shown again in Block Diagram 2200, in step 2203 a user may select to enter address and contact data including, but not limited to, a physical address, an email address or a phone number. In some embodiments of the present invention, a user may also elect to omit this step. Not shown in Block Diagram 2200, in other embodiments of the present invention, it may be mandatory for the user to enter or confirm an email address or phone number. In step 2204, a user may elect to enter business data including, but not limited to, a company name, company address and contact data, or operational details about the users' company. In some embodiments of the present invention, a user may elect to omit this step. In step 2205, a user may elect to enter payment data including, but not limited to, a payment preference, bank account details or credit card information. In some embodiments of the present invention, users may have a preference for receiving an invoice. In other embodiments of the present invention, users may have a preference for payment by credit card or direct money transfer. In yet other embodiments of the present invention, users may have a preference for other forms of payment. In some embodiments of the present invention, a user may elect to omit this step. In specific embodiments of the present invention, steps 2203 through 2205 may not be part of the system. In step 2206, Component 201 saves the registration data provided by the user and sends it to Component 202 for storage and use, for example to allow users of System 200 to log into the system.

Referring to FIG. 3, shown is Block Diagram 300 comprising a flow for one embodiment of the present invention to manually create an electronic record of a process in reference to System 200 and Network 100. The flow shown in Block Diagram 300 comprises of seven steps and begins with step 301 in which a user logs into System 200 to manually create an electronic record of a process using Component 205. In step 302 a user enters or selects detailed information about a process to create an electronic record. For example, in a transport process detailed information may include, but is not limited to, an origin location, a destination location, details about the freight or transportation cost. In step 303 a user may select or attach documents. In some embodiments of the present invention, System 200 may maintain often used documents using Component 207 from which a user can select the documents that he wishes to attach to the electronic record. In other embodiments of the present invention, a user may elect to attach documents that were not previously stored in System 200. In yet other embodiments of the present invention, a user may select previously stored documents and also add new ones. For example, a user may attach a commercial invoice, bill of lading, manifest or special handling instructions. In some embodiments of the present invention, the user may elect to omit this step, for example if there are no documents to attach during the setup of the electronic record. In step 304 a user may select the types of event data that should be collected during the execution of the process by an operator. For example, in a transport process a user may ask an operator to allow for the collection of regular updates of his location while driving along a route, to take images of the loading and unloading of freight, or to collect signatures during pickup and drop-off as proof that everything was handled correctly from the perspective of a warehouse or operations supervisor. In some embodiments of the present invention, the user may elect to omit this step, for example if there is no event data to select or if a predetermined selection of event data already exists. In some embodiments of the present invention, System 200 may be designed to allow additional parties to observe the progress of a process during its execution. In this case, a user may add additional parties in step 305 that are allowed to monitor or observe the execution of a process. For example, additional parties could be organizations that are not sharing access to an electronic record in System 200 but may be invited to receive updates about specific aspects of progress during the execution of a process. These additional parties may be notified of their inclusion in a process or transaction by way of receiving email or text messages. In some embodiments of the present invention additional parties may only view a part of the available data. In some embodiments of the present invention, the user may elect to omit this step, for example if there are no additional parties to invite. In some embodiments of the present invention there may also not be a step where users invite additional parties. In step 306 a user invites at least one partner to share and update an electronic record of a process. The process for inviting a partner is described in more detail in Block Diagram 500 and in the description of Component 212 of System 200. In step 307 Component 205 sends the electronic record of a process to Component 206 for processing and storage.

Referring to FIG. 4, shown is Block Diagram 400 comprising a flow for another embodiment of the present invention to automatically create an electronic record of a process in reference to System 200 and Network 100. The flow shown in Block Diagram 400 comprises of seven steps and begins with step 401 when an external system sends an electronic record of a process to Component 205 using Element 105 in Network 100. Interfaces to external data sources are described in detail in the discussion of Component 209 in System 200. For example, data in an external record used during a supply chain transaction may include, but is not limited to, an origin location, a destination location, details about the freight, a route or transport cost. Not shown in Block Diagram 400, an external system may create an electronic record of a process that does not need to be changed or refined any further. For example, it may already include all needed documents, preferences for event data and a list of additional parties and partners that are to be invited. Shown again in Block Diagram 400, in step 402 a user may select an electronic record of a process imported from an external system that has been created automatically in order to edit the electronic record of a process using Component 205. In step 403 the user may attach one or more documents to the electronic record. In some embodiments of the present invention, System 200 may maintain a list of often-used documents stored by Component 208 from which a user may select the ones that he wants to attach to the electronic record. In other embodiments of the present invention, a user may select to attach documents that were not previously stored in System 200. In yet other embodiments of the present invention, a user may select stored documents and also add new ones. For example, a user may attach a commercial invoice, bill of lading, manifest or special handling instructions. In some embodiments of the present invention, the user may also elect to omit this step, for example, if there are no documents to attach. In step 404 a user may select the types of event data that should be collected during the execution of the process. For example, in a transport process a user may ask an operator to agree to the sending regular updates of his location while driving along a route, to take images of the loading and unloading of freight, or to collect signatures during pickup and drop-off as proof that everything was handled correctly from the perspective of a warehouse or operations supervisor. In some embodiments of the present invention, the user may also elect to omit this step, for example, if there is no event data to select. In some embodiments of the present invention, System 200 may be used to allow additional parties to observe the progress of a process during its execution. In this case, a user may add additional parties in step 405 that are allowed to observe the execution of a process. For example, additional parties could be organizations that are not sharing direct access to an electronic record in System 200, but that may be invited to receive updates about progress or an estimated time of arrival during the execution of a process. Additional contacts may be updated by way of receiving email or text messages or by seeing a specifically designed view that just shares a subset of available data. In some embodiments of the present invention, the user may elect to omit this step, for example if there are no additional parties to invite. In some embodiments of the present invention there may not be a step where users invite additional parties. In step 406 a user invites at least one supply chain partner to share and update an electronic record of a process. The process for inviting a partner is described in more detail in Block Diagram 500 and in the description of Component 212 of System 200. In step 407 Component 205 updates the electronic record of a process and sends it to Component 206 for processing and storage.

Referring to FIG. 5, shown is Block Diagram 500 comprising a flow to invite a partner to share and update an electronic record of a process in reference to System 200 and Network 100. The flow shown in Block Diagram 500 comprises of eight steps and begins with step 501 when a user identifies a partner to invite for sharing and updating an electronic record of a process using Component 205. In step 502 a user enters a unique identifier for the partner. Unique identifiers may include, but are not limited to, email address, phone number, or username. In step 503 Component 205 saves the invite data entered by the user and sends it to Component 212. In step 504 Component 212 requests that Component 202 checks whether the partner has already registered in System 200 in which case a partner record exists. If a partner record exists, Component 212 sends a notification to the invited partner in step 505. If the partner is not known in System 200, Component 212 sends a welcome message with a link to a registration page in step 506 to the invited partner. In this case, the new partner may register to use System 200 in step 507. The registration process has been described in detail in Block Diagram 2200. In step 508 Component 211 associates the partner to the electronic record of a process and records that the partner now has access to the electronic record of a process.

Not shown in Block Diagram 500 are other embodiments of the present invention in which new users may be invited to view an electronic record of a process by way of selection. For example, a human or machine operator or a software program may determine which partners should be invited to share and update an electronic record of a process. Further not shown in Block Diagram 500 are cases where a user may enter additional data about an invited partner such as data that may be used later when the partner registers to access System 200.

Referring to FIG. 6, shown is Block Diagram 600 comprising a flow to share a document associated with an electronic record of a process in reference to System 200 and Network 100. The flow shown in Block Diagram 600 comprises of six steps and begins with step 601 in which a user identifies a document that he wishes to share by adding it to the electronic record of the process in System 200. In step 602 the user checks whether the document is already stored in System 200 using component 207. If it is, the user selects the document and component 206 associates the selected document with the electronic record of a process in step 603. If the document has not been previously stored in System 200, the user uploads a new document using Component 206 and Component 207 associates the uploaded document to the electronic record of a process in step 604. In both cases, whether the document had been previously stored or not, Component 211 checks which partners have been invited to view the specific electronic record of a process and whether they are authorized to view the document in step 605. In some embodiments of the present invention, a user setting up an electronic record of a process may designate which documents and event data partners are authorized to view. In other embodiments of the present invention, partner access to documents and event data may be based on predefined rules or an authorization configuration. In yet other embodiments of the present invention, partners may view all documents and event data associated to an electronic record of a process. In step 606 System 200 displays the document to those partners who have been authorized, but not to partners who are not authorized to view the document.

Referring to FIG. 7, shown is Block Diagram 700 comprising a flow to share event data with a partner in reference to System 200 and Network 100. The flow shown in Block Diagram 700 comprises of seven steps and begins with step 701 in which an operator captures event data using an operator computer (103) such as a data capture device. In step 702 the operator computer sends the event data to Component 208. In step 703 Component 208 processes the event data for display. In some embodiments of the present invention, Component 208 may not need to further process the event data received from an operator computer, for example in cases where further processing is not necessary such as with textual information. In step 704 a partner accesses System 200 using Component 202 and in step 705 the partner selects to display an electronic record of a process. In step 706 Component 211 checks the partner authorization to view event data. In some embodiments of the present invention, users of System 200 may elect to share all event data with partners and observers. In other embodiments of the present invention, users may designate which partner or observer may view which event data. In step 707 System 200 displays the event data to the partner, if he is authorized to view the event data.

Referring to FIG. 8, shown is Block Diagram 800 comprising a flow to create a summary file of an electronic record of a process in reference to System 200 and Network 100. In some embodiments of the present invention, a summary file of an electronic record may be created by System 200. In other embodiments of the present invention, a summary file may not be created. In further embodiments of the present invention, a system other than System 200 may create a summary file of the electronic record of a process. In yet further embodiments of the present invention, a summary file may contain all event data and documents that have been associated to the electronic record of a process. In still further embodiments of the present invention, a summary file may only contain a subset of associated event data or documents. The flow shown in Block Diagram 800 constitutes one example for the creation of a summary file and comprises of nine steps. It begins with step 801 in which a process concludes so that no further event data or documents are going to be added to the electronic record of the process. In step 802 Component 206 assesses all data generated or used during the execution of a process. In step 803 Component 206 creates a summary file for an electronic record in which to aggregate and present all relevant data used, created or gathered during the execution of a process. In step 804 Component 206 adds shipment, material and route data to the summary file. In step 805 Component 206 adds event data gathered or generated during the execution of a process to the summary file. In step 806 Component 206 adds shipper, user or partner data created, gathered or generated during the execution of a process to the summary file. In step 807 Component 206 adds operator data created, gathered or generated during the execution of a process to the summary file. In step 808 Component 206 adds the documents that were used or have been created during the execution of a process to the summary file. In step 809 Component 206 saves the summary file and associates it to an electronic record of a process.

Not shown in Block Diagram 800, there may be cases in which multiple summary files may need to be created because different parties have different authorizations to view event data and documents. The logic shown in Block Diagram 800 still applies in this case while Component 206 uses Component 211 to validate the access rights for each partner.

Referring to FIG. 9, shown is Block Diagram 900 comprising a practical example for sharing of event data and documents during the execution of a process in reference to System 200 and Network 100. In the example a first user may be a shipper who invites a first partner who may be a transportation dispatcher to manage and oversee the delivery of freight from a factory to a retail location using a supply chain asset. The process may be handled by an operator such as a truck driver. The flow shown in Block Diagram 900 comprises of twelve steps and begins with step 901 in which a first user creates a new electronic record for a process in System 200. In step 902 a first user uploads a bill of lading (BOL) and a handling instruction document for the materials that are transported using Component 207. Not shown in Block Diagram 900, Component 207 may process both documents and will save them and then Component 206 associates them to the electronic record of this process. Shown again in Block Diagram 900, in step 903, using Component 212, a first user invites a first partner to share an electronic record of the process including all event data and documents. In step 904 a first partner accepts the invitation from a first user and is now able to view the electronic record of the process along with its event data and documents in System 200. In step 905 a first partner uploads a rate confirmation as a third document using Component 207. The new document is now available to a first user as well. In step 906 a first partner invites an operator to carry the freight from the factory to the retail location. In step 907 the operator accepts the invitation on his computer (103) such as a smart phone or tablet. In step 908 the operator collects event data such as GPS locations, photographic images of the freight during loading and unloading as well as signatures from supervisors at the manufacturing and retail location during pickup and drop-off respectively. The operator computer (103) sends all event data to System 200 where it may be processed by Component 208. In step 909 Component 208 processes the event data captured by the operator and Component 206 adds it to the electronic record of the process so that the first user and first partner may view it. Once the operator completes all activities related to the delivery of the freight to a retail location, the operator acknowledges the completion of the process in step 910 on his computer (103). In step 911 the process now completes, and Component 206 creates a summary file of the electronic record in step 912.

Referring to FIG. 10, another embodiment of the present invention for a network comprising a distributed ledger for the creation, sharing and updating of an electronic record in regard to the execution of a process is shown. Network 1000 comprising a distributed ledger comprises several computers including the system described by the present invention disclosure (1001, 1100), a network for data sharing (1002), a distributed ledger network comprising at least one node (1003), operator computers (1004), partner computers (1005) and external data sources (1006). The main difference between Network 100 and Network 1000 is that the latter comprises a distributed ledger.

With the exception of Element 1003, the remaining elements 1001 through 1006 function in the same manner as their corresponding Elements 101 through 105 described in Network 100 with the exception that Network 1000 comprises a distributed ledger.

Element 1001 (System 1100) shows a system comprising a distributed ledger for the creation, sharing, updating and storage of electronic records of a process. Its components are described in detail in FIG. 11. Element 1001 comprising a distributed ledger allows users to register, to create, share and display electronic records of a process, to upload documents and update data contained in an electronic record, to create a summary file of an electronic record, to create a hash of a summary file and to store an electronic record of a process. FIG. 10 should not imply that Network 1000 requires precisely one electronic record system for processes (1001) comprising a distributed ledger or is limited to a specific number of electronic record systems for processes (1001) comprising a distributed ledger.

Element 1002 shows the network by which computers may share data with each other and by which System 1001 may access a distributed ledger (1003).

Element 1003 is a distributed ledger comprising at least one node. A distributed ledger may be private, public, or a hybrid form of private-public. Different distributed ledger technologies or platforms may include, but are not limited to, Bitcoin Blockchain, Ethereum Blockchain, Hashgraph or Directed Acyclic Graph technology. Data may be written to a distributed ledger in several formats including, but not limited to, a hash, in encrypted form, in otherwise abstracted form or in its original form. Data may also be written to two or more separate distributed ledgers. For example, a hash of data may be written to a public distributed ledger and the same data may also be written to a private distributed ledger in its original form. Data may also be written partially to a first distributed ledger and partially to a second distributed ledger. For example, a hash of data may be split into two parts where one part is written to a first distributed ledger and a second part to a second distributed ledger. In some embodiments of the present invention some or all data contained in an electronic record of a process may be stored on a distributed ledger exclusively. In this way, a distributed ledger may serve as a repository for some or all data that is created and shared before, during or after the execution of a process. In other embodiments of the present invention event data and documents that did not previously exist in other Elements of Network 1000 may be obtained from a distributed ledger. In still other embodiments of the present invention data stored on a distributed ledger may serve as the basis for decision-making by third parties not directly involved in the execution of a process such as banks, insurance agencies, factoring providers or leasing providers.

Element 1004 shows an operator computer used by a person or machine to access an electronic record of a process, to capture event data and, in some embodiments of the present invention, documents. FIG. 10 should not imply that Network 1000 requires precisely one operator computer (1004) or is limited to a specific number of operator computers (1004). In certain embodiments of the present invention, Component 1104 may create a hash of operator data or operator registration data.

Element 1005 shows a partner computer used by a person or machine to participate in the sharing and updating of an electronic record containing event data and documents during the execution of a process. FIG. 10 should not imply that Network 1000 requires precisely one partner computer (1005) or is limited to a specific number of partner computers (1005).

Element 1006 shows external data sources used to obtain event data or documents regarding the execution of a process. FIG. 10 should not imply that Network 1000 requires precisely one external data source (1006) or is limited to a specific number of external data sources (1006).

Sharing of event data between two or more of the Elements in Network 1000 occurs by means of communication in the same manner described for Network 100.

In some embodiments of the present invention, Elements in Network 1000 may display an electronic record, event data or documents in graphical form, numerical or textual form, on a map, or as a performance metric to a user.

In some embodiments of the present invention, Elements in Network 1000 may be located on or embedded in a supply chain asset. For example, a supply chain asset may integrate Element 1004 into its own computing systems and devices that are used for the capture and processing of event data may be connected to the supply chain asset as well. A practical example may be that Element 1004 may be part of an on-board computer of an autonomous vehicle, which also connects to a variety of sensors including, but not limited to, cameras, operational vehicle sensors, GPS sensors, weight sensors, temperature sensors, or light sensors.

Referring to FIG. 11, another embodiment of the present invention for a system comprising a distributed ledger for the creation, sharing, updating and storage of an electronic record of a process is shown. System 1100 comprising a distributed ledger comprises of fourteen components used in the creation, sharing, updating and storage of an electronic record of a process. The main difference between System 200 and System 1100 is that the latter comprises a distributed ledger.

Components 1101 through 1112 function identical to Components 201 through 212.

Component 1113 handles the connection between System 1100 comprising a distributed ledger and a network of nodes on one or more distributed ledgers (1003). For example, Component 1113 handles authorizations to access a network of nodes on distributed ledger (1003) and submits data that has been designated to be written to a distributed ledger. In some embodiments of the present invention, Component 1113 may connect to more than one distributed ledger at a time and may write data to one or more distributed ledgers. In some embodiments of the present invention, Component 1113 may connect to more than one distributed ledger to write partial data to a first distributed ledger and partial data to a second distributed ledger. In some embodiments of the present invention, Component 1113 may request event data or documents from one or more distributed ledgers that it connects to. In some embodiments of the present invention, Component 1113 may write electronic records, event data or documents to a distributed ledger at the time when the data has been collected and processed. In other embodiments of the present invention, Component 1113 may write data about electronic records, event data or documents to a distributed ledger at the time when the electronic record of a process has been completed and a summary file has been established. For example, all data from an electronic record of a process, all event data and all documents may be combined into a summary file, which is then written to a distributed ledger in its original format or as a hash. In yet other embodiments of the present invention, Component 1113 may write a hash of data to one or more distributed ledgers. In particular embodiments of the present invention, Component 1113 may write data in its original form to one or more distributed ledgers.

Component 1114 stores hashes of data that have been generated by other Components in System 1100 comprising a distributed ledger. Hashes stored in Component 1114 are associated with their original electronic records, event data, documents and summary files so that original documents can be retrieved when they are needed. In some embodiments of the present invention hashes may be stored elsewhere so that Component 1114 may not be required.

Referring to FIG. 12, a block diagram with a practical example for linking data blocks on a distributed ledger, a blockchain in this case, using hashes is shown. Block Diagram 1200 comprises of six elements to illustrate how blocks form a chain on a distributed ledger. Element 1201 shows a first block in a distributed ledger that is often called a genesis block. Data elements 1.1 to 1.n have been written to the first block. Element 1201 as the first block does not contain a hash since no previous blocks exist. When no further data is written to a first block, a hash of the first block is created as illustrated by Element 1202. The hash representing the content of the first block is written to the second block and new data elements 2.1. to 2.n are added to the second block until it has been completed as shown in Element 1203. Then a hash of the data contained in the second block is created as shown by Element 1204. The hash representing the second block is written to a third block and new data elements 3.1. to 3.n are added to the third block until it has been completed as shown in Element 1205. Then a hash of the data contained in the third block is created as shown in Element 1206. This process continues for all future blocks on the distributed ledger.

Data itself may also be written to a distributed ledger in the form of a hash or in its original format. When data is stored on a distributed ledger in hashed form, a computer applies a hash function to create a hash, or mathematical abstraction, of the original data. This is important to prove at later points in time that the original data has not been changed or altered by a user of a computer system or by the computer system itself. When this proof may be required at a later point in time, a user may create a hash of the original data available in a computer system and compare it to a hash written to a distributed ledger at the time the hash was added. If the first and second hashes do not match, a user knows that the data has been altered or compromised. When data is stored on a distributed ledger in its original form, data formats include, but are not limited to, in complete and unaltered ("original") form, in formatted form, in abstracted form, in abbreviated form, in compressed form, or in encrypted form.

A practical example of hashed and whole data is a bill of lading document. In its original form, the document contains data such as origin and destination locations, information about materials that are being shipped and other details that describe a shipment transaction. The document itself is the original data in that anyone can read and understand its contents. When a hash algorithm is applied, the contents of the document are represented by a string of characters. A person or computer that analyzes the original data can derive meaning from it while this is not possible when the same person or computer analyzes a hash, which is just an abstract string of characters. For example, if the sentence "Today is a warm and pleasant day" is converted into a hash using an MD5 algorithm, the resulting hash is "890863fc4d30a9d4b5f1d857fbe3e2ed". If the sentence is slightly changed, the hash value also changes, which makes it possible to prove that original data inside of a document has changed. For example, if the sentence changes to "Today is a cold and pleasant day" the hash value changes to "eb65089fedc860ca35c3107ddd280b74" using the same algorithm.

Referring to FIG. 13, shown is Block Diagram 1300 comprising a flow to store an original document to a private distributed ledger in reference to System 1100 and Network 1000. The flow shown in Block Diagram 1300 comprises of seven steps and begins with step 1301 in which a user uploads a document, for example a Bill of Lading (BOL), to System 1100 in reference to a specific electronic record of a process. In step 1302 Component 1107 processes and stores the BOL document and Component 1106 associates it with electronic record of a process to make it available for display to users of System 1100. In step 1303 Component 1107, or in other embodiments not shown in FIG. 13 Component 1106, notifies Component 1113 that the BOL document is available to be added to a private distributed ledger. In step 1304 Component 1113 requests that the BOL document be added to a private distributed ledger. In step 1305 Component 1113 adds the BOL document to a block and broadcasts the transaction to a network of nodes (1003) participating in a private distributed ledger. Not shown in Block Diagram 1300, a BOL document may be added to a block on a distributed ledger by a system or component that is not part of System 1100. For example, Component 1113 may send the instruction to add the BOL document to a block on a distributed ledger to a dedicated distributed ledger system rather than adding the BOL document to a block directly. In step 1306 the nodes in the network (1003) validate the transaction and add the BOL document to their blocks. In step 1307 the BOL document has been added to a block and to a private distributed ledger.

Not shown in Block Diagram 1300 in some embodiments of the present invention a hash of an electronic record, event data, a document, a summary file, or user credentials may be written to a private or public distributed ledger. Also not shown in Block Diagram 1300 in other embodiments of the present invention a document file may be written to a public distributed ledger in its original format. Further not shown in Block Diagram 1300 in further embodiments of the present invention an electronic record, event data, a summary file or user credentials may be written to a private or public distributed ledger in their original format. Still further not shown in Block Diagram 1300 in certain embodiments of the present invention data may be written to a distributed ledger at certain point in time or on certain days as opposed to immediately.

Referring to FIG. 14, shown is Block Diagram 1400 comprising a flow to write a hash of a summary file of an electronic record of a process to a public distributed ledger in reference to System 1100 and Network 1000. The flow shown in Block Diagram 1400 comprises of nine steps and begins with step 1401 in which a process concludes so that no further event data or documents are going to be added to the electronic record of the process. In step 1402 Component 1106 saves a summary file of the electronic record of the process and attaches it to the electronic record itself. In step 1403 Component 1106 creates a hash of the summary file and stores it using Component 1114. In step 1404 Component 1106 associates the hash with summary file and the electronic record of the process. In step 1405 Component 1106 notifies Component 1113 that a hash of a summary file of the process is available to be added to a public distributed ledger. In step 1406 Component 1113 requests that the hash of a summary file be added to a public distributed ledger. In step 1407 Component 1113 adds the hash of a summary file to a block and broadcasts the transaction to a network of nodes (1003) participating in a public distributed ledger. Not shown in Block Diagram 1400, a hash of a summary file of an electronic record of a process may be added to a block on a distributed ledger by a system or component that is not part of System 1100. For example, Component 1113 may send the instruction to add the hash of a summary file of an electronic record of a process to a block on a distributed ledger to a dedicated distributed ledger system rather than adding the hash of a summary file of an electronic record of a process to a block directly. In step 1408 the nodes in the network (1003) validate the transaction and add the hash of a summary file to their blocks. In step 1409 the hash of a summary file has been added to a block and to a public distributed ledger.

Not shown in Block Diagram 1400, in some embodiments of the present invention a hash of an electronic record, event data, a document, or user credentials may be written to a public or private distributed ledger. Further not shown in Block Diagram 1400 in other embodiments of the present invention an electronic record, event data, a document, a summary file or user credentials may be written to a public or private distributed ledger in their original form. Also not shown in Block Diagram 1400 in further embodiments of the present invention a summary file may be written to a public distributed ledger in its original format. Still further not shown in Block Diagram 1400 in certain embodiments of the present invention data may be written to a distributed ledger at certain point in time or on certain days as opposed to immediately.

Referring to FIG. 15, shown is Block Diagram 1500 comprising a practical example of a flow for writing event data, in this case a photographic image, in its original form to a private distributed ledger in reference to System 1100 comprising a distributed ledger and Network 1000. In the example an operator is a person who moves freight such as a truck driver. The flow shown in Block Diagram 1500 comprises of eleven steps and begins with step 1501 in which an operator uses Element 1004 to capture event data in the form of a photo of freight. For example, the operator may wish to document the condition of the freight during a delivery process so that he can later prove that the freight was properly transported, did not experience damages and that no other harm came to it. In step 1502 the operator computer (1004) sends the photographic image to Component 1108 for processing and storage. In step 1503 Component 1308 processes the photo, for example by formatting it, reducing its file size or converting it into a PDF format. In step 1504 Component 1108 stores the photo of the freight. In step 1505 Component 1106 associates the photo of the freight to an electronic record of a process. In step 1506 Component 1106 notifies Component 1113 that a photo is available to be added to a private distributed ledger. In step 1507 Component 1113 requests that the photo of freight is added to a private distributed ledger. In step 1508 Component 1113 adds the photo to a block and in step 1509 Component 1113 broadcasts the transaction to a network of nodes (1003) participating in the private distributed ledger. In step 1510 the nodes in the network validate the transaction and add the photo of freight to their blocks. In step 1511 the photo of freight has been added to a block and to a private distributed ledger. Not shown in Block Diagram 1500, a photo may be added to a block on a distributed ledger by a system or component that is not part of System 1100. For example, Component 1113 may send the instruction to add a photo to a block on a distributed ledger to a dedicated distributed ledger system rather than adding the photo to a block directly.

Referring to FIG. 16, another embodiment of the present invention for a network comprising two or more distributed ledgers for the creation, sharing, updating and storage of an electronic record in regard to the execution of a process is shown. Network 1600 comprising of two or more distributed ledgers comprises several computers including the systems previously described in the present invention disclosure for Network 100 and Network 1000. Network 1600 comprising a distributed ledger comprises of a system to handle electronic records of a process (1601), a network for data sharing (1602), a first distributed ledger network comprising at least one node (1603), a second distributed ledger network comprising at least one node (1604), an operator computer (1605), a partner computer (1606) and external data sources (1607). The main difference between Network 1000 and Network 1600 is that the latter comprises two or more distributed ledgers. System 1100 comprising a distributed ledger functions in Network 1600 in the same way as it does in Network 1000 with the exception that they store data on more than one distributed ledger.

Element 1601 (System 1100) shows the system for creating, sharing, updating and storing an electronic record of a process. Its components are described in detail in FIG. 11. FIG. 16 should not imply that Network 1600 requires precisely one electronic record system for processes (1601) or is limited to a specific number of electronic record systems for processes (1601).

Element 1602 shows the network by which other Elements in Network 1600 may share data with each other and by which they may access two or more distributed ledgers (1603, 1604). This embodiment of the present invention disclosure shows two distributed ledgers, but in some embodiments of the present invention all systems and methods discussed here apply equally to the use of three and more distributed ledgers as well.

Element 1603 is a first distributed ledger comprising at least one node. Element 1604 is a second distributed ledger comprising at least one node. Elements 1603 and 1604 function in the same way as Element 1003 in Network 1000.

Element 1605 shows an operator computer used by a person or machine to access an electronic record of a process. Element 1605 functions in the same way as Element 1004 in Network 1000.

Element 1606 shows a partner computer used by a person or machine to participate in the sharing and updating of an electronic record containing event data and documents during the execution of a process. Element 1606 functions in the same way as Element 1005 in Network 1000.

Element 1607 shows external data sources used to obtain event data or documents regarding the execution of a process. Element 1607 function in the same way as Element 1006 in Network 1000.

A practical example for when electronic records, summary files, event data, documents or user credentials that may be stored on more than one distributed ledger is that different parties involved in the operation and execution of a supply chain transaction may wish to use private distributed ledgers in addition to a public distributed ledger. Another example may be that different parties may prefer the use of different distributed ledger technologies, which would necessitate the writing of event data to more than one distributed ledger. Still another example may be that an implementation of one embodiment of the present invention is based on the use of a public distributed ledger for writing of hashes while data in its original form may be written to a private distributed ledger. Still another example may be that data may need to be made available to third-parties such as insurance or financing companies who may have their own distributed ledger technology. Still another example may be that some or all of the parties involved in the sharing and updating of an electronic record of a process may maintain their own distributed ledger.

Referring to FIG. 17, shown is Block Diagram 1700 comprising a flow to write to write a hash of a summary file of an electronic record to two or more public distributed ledgers (1603, 1604) in reference to System 1100 and Network 1600. The flow shown in Block Diagram 1700 comprises of eleven steps and begins with step 1701 in which a process completes so that no further event data or documents are going to be added to the electronic record of the process, which triggers Component 1106 to create and save a summary file of the electronic record and to associate the summary file to the electronic record itself. In step 1702 Component 1106 creates a hash of the summary file, stores the hash using component 1114 and associates it to the summary file itself and the electronic record. In step 1703 Component 1106 notifies Component 1113 that a hash of a summary file of the process is available to be added to two public distributed ledgers. In step 1704 Component 1113 requests that the hash of a summary file be added to a first public distributed ledger (1603) and in step 1705 Component 1113 requests that the hash of a summary file be added to a second public distributed ledger (1604). In step 1706 Component 1113 adds the hash of a summary file to a block and broadcasts the transaction to a first network of nodes participating in a first public distributed ledger (1603). In step 1707 Component 1113 adds the hash of a summary file to a block and broadcasts the transaction to a second network of nodes participating in a second public distributed ledger (1604). In step 1708 the nodes in a first network validate the transaction and add the hash of a summary file to their blocks. In step 1709 the nodes in a second network validate the transaction and add the hash of a summary file to their blocks. In step 1710 the hash of a summary file has been added to a block and to a first public distributed ledger (1603). In step 1711 the hash of a summary file has been added to a block and to a second public distributed ledger (1604).

Not shown in Block Diagram 1700, in some embodiments of the present invention a hash of an electronic record, event data, a document, or user credentials may be written to two or more public or private distributed ledgers. Further not shown in Block Diagram 1700 in other embodiments of the present invention an electronic record, event data, a document, a summary file or user credentials may be written to two or more public or private distributed ledgers in their original form. Also not shown in Block Diagram 1700 in further embodiments of the present invention a summary file may be written to two or more public distributed ledgers in its original format. Still further not shown in Block Diagram 1700 in certain embodiments of the present invention data may be written to two or more distributed ledgers at certain point in time or on certain days as opposed to immediately. Still not shown in Block Diagram 1700, in certain embodiments of the present invention a first distributed ledger may be public, and a second distributed ledger may be private or vice versa. Further not shown in Block Diagram 1700, a hash of a summary file of an electronic record of a process may be added to a block on a distributed ledger by a system or component that is not part of System 1100. For example, Component 1113 may send the instruction to add a hash of a summary file of an electronic record of a process to a block on a distributed ledger to a dedicated distributed ledger system rather than adding the hash of a summary file of an electronic record of a process to a block directly.

Referring to FIG. 18, shown is Block Diagram 1800 comprising a flow to write a summary file of an electronic record in its original format to two or more private distributed ledgers (1603, 1604) in reference to System 1100 and Network 1600. The flow shown in Block Diagram 1800 comprises of ten steps and begins with step 1801 in which a process completes so that no further event data or documents are going to be added to the electronic record of the process, which triggers Component 1106 to create and save a summary file of the electronic record and to associate the summary file to the electronic record itself. In step 1802 Component 1106 notifies Component 1113 that a summary file of an electronic record of a process is available to be added to two private distributed ledgers. In step 1803 Component 1113 requests that the summary file be added to a first private distributed ledger (1603) and in step 1804 Component 1113 requests that the summary file be added to a second private distributed ledger (1604). In step 1805 Component 1113 adds the summary file to a block and broadcasts the transaction to a first network of nodes participating in a first private distributed ledger (1603). In step 1806 Component 1113 adds the summary file to a block and broadcasts the transaction to a second network of nodes participating in a second private distributed ledger (1604). In step 1807 the nodes in a first network validate the transaction and add the summary file to their blocks. In step 1808 the nodes in a second network validate the transaction and add the summary file to their blocks. In step 1809 the summary file has been added to a block and to a first private distributed ledger (1603). In step 1810 the summary file has been added to a block and to a second private distributed ledger (1604).

Not shown in Block Diagram 1800, in some embodiments of the present invention a hash of an electronic record, event data, a document, a summary file, or user credentials may be written to two or more public or private distributed ledgers. Further not shown in Block Diagram 1800 in other embodiments of the present invention an electronic record, event data, a document, or user credentials may be written to two or more public or private distributed ledgers in their original form. Also not shown in Block Diagram 1800 in further embodiments of the present invention a summary file may be written to two or more public distributed ledgers in its original format. Still further not shown in Block Diagram 1800 in certain embodiments of the present invention data may be written to two or more distributed ledgers at certain point in time or on certain days as opposed to immediately. Also not shown in Block Diagram 1800, in certain embodiments of the present invention a first distributed ledger may be public, and a second distributed ledger may be private or vice versa. Further not shown in Block Diagram 1800, a summary file of an electronic record of a process may be added to a block on a distributed ledger by a system or component that is not part of System 1100. For example, Component 1113 may send the instruction to add a summary file of an electronic record of a process to a block on a distributed ledger to a dedicated distributed ledger system rather than adding the summary file of an electronic record of a process to a block directly.

Referring to FIG. 19, shown is Block Diagram 1900 comprising a flow to write a partial summary file to a first private distributed ledger (1603) and a partial summary file to a second private distributed ledger (1604) in reference to System 1100 and Network 1600. The flow shown in Block Diagram 1900 comprises of eleven steps and begins with step 1901 in which a process completes so that no further event data or documents are going to be added to the electronic record of the process, which triggers Component 1106 to create and save a summary file of the electronic record and to associate the summary file to the electronic record itself. In step 1902 Component 1106 splits the summary file of an electronic record into two parts and associates both with the electronic record and the original summary file. In step 1903 Component 1106 notifies Component 1113 that a first and a second part of a summary file of an electronic record are available to be added to two private distributed ledgers. In step 1904 Component 1113 requests that a first part of a summary file be added to a first private distributed ledger (1603) and in step 1905 Component 1113 requests that a second part of a summary file be added to a second private distributed ledger (1604). In step 1906 Component 1113 adds a first part of a summary file to a block and broadcasts the transaction to a first network of nodes participating in a first private distributed ledger (1603). In step 1907 Component 1113 adds a second part of a summary file to a block and broadcasts the transaction to a second network of nodes participating in a second private distributed ledger (1604). In step 1908 the nodes in a first network validate the transaction and add a first part of a summary file to their blocks. In step 1909 the nodes in a second network validate the transaction and add a second part of a summary file to their blocks. In step 1910 a first part of a summary file has been added to a block and to a first private distributed ledger (1603). In step 1911 a second part of a summary file has been added to a block and to a second private distributed ledger (1604).

Not shown in Block Diagram 1900, in some embodiments of the present invention a hash of a partial electronic record, partial event data, a partial document, a partial summary file, or partial user credentials may be written to two or more public or private distributed ledgers. Further not shown in Block Diagram 1900 in other embodiments of the present invention a partial electronic record, partial event data, a partial document, or partial user credentials may be written to two or more public or private distributed ledgers in their original form. Also not shown in Block Diagram 1900 in further embodiments of the present invention partial summary files may be written to two or more public distributed ledgers in their original format. Still further not shown in Block Diagram 1900 in certain embodiments of the present invention data may be written to two or more distributed ledgers at certain point in time or on certain days as opposed to immediately. Also not shown in Block Diagram 1900, in certain embodiments of the present invention a first distributed ledger may be public, and a second distributed ledger may be private or vice versa. Further not shown in Block Diagram 1900, a first and second partial summary file of an electronic record of a process may be added to blocks on two or more distributed ledgers by a system or component that is not part of System 1100. For example, Component 1113 may send the instruction to add a first and second partial summary file of an electronic record of a process to block on two or more distributed ledgers to one, two or more dedicated distributed ledger systems rather than adding the first and second partial summary file of an electronic record of a process to a block directly.

Referring to FIG. 20, shown is Block Diagram 2000 comprising a flow to write a first partial hash of a summary file to a first public distributed ledger (1603) and a second partial hash of a summary file to a second public distributed ledger (1604) in reference to System 1100 and Network

1600. The flow shown in Block Diagram 2000 comprises of eleven steps and begins with step 2001 in which a process completes so that no further event data or documents are going to be added to the electronic record of the process, which triggers Component 1106 to create and save a summary file of the electronic record and to associate the summary file to the electronic record itself. In step 2002 Component 1106 creates a hash of the summary file and splits the hash of the summary file of an electronic record into two parts and associates both with the electronic record and the original summary file. The hash and its two parts are stored using Component 1114. In step 2003 Component 1106 notifies Component 1113 that a first and a second part of a hash of a summary file of an electronic record are available to be added to two public distributed ledgers. In step 2004 Component 1113 requests that a first part of a hash of a summary file be added to a first public distributed ledger (1603) and in step 2005 Component 1113 requests that a second part of a hash of a summary file be added to a second public distributed ledger (1604). In step 2006 Component 1113 adds a first part of a hash of a summary file to a block and broadcasts the transaction to a first network of nodes participating in a first public distributed ledger (1603). In step 2007 Component 1113 adds a second part of a hash of a summary file to a block and broadcasts the transaction to a second network of nodes participating in a second public distributed ledger (1604). In step 2008 the nodes in a first network validate the transaction and add a first part of a hash of a summary file to their blocks. In step 2009 the nodes in a second network validate the transaction and add a second part of a hash of a summary file to their blocks. In step 2010 a first part of a hash of a summary file has been added to a block and to a first public distributed ledger (1603). In step 2011 a second part of a hash of a summary file has been added to a block and to a second public distributed ledger (1604).

Not shown in Block Diagram 2000, in some embodiments of the present invention a partial hash of an electronic record, event data, a document, or user credentials may be written to two or more public or private distributed ledgers. Still further not shown in Block Diagram 2000 in certain embodiments of the present invention data may be written to two or more distributed ledgers at certain point in time or on certain days as opposed to immediately. Also not shown in Block Diagram 2000, in certain embodiments of the present invention a first distributed ledger may be public, and a second distributed ledger may be private or vice versa. Further not shown in Block Diagram 2000, a first and second partial hash of a summary file of an electronic record of a process may be added to blocks on two or more distributed ledgers by a system or component that is not part of System 1100. For example, Component 1113 may send the instruction to add a first and second partial hash of a summary file of an electronic record of a process to block on two or more distributed ledgers to one, two or more dedicated distributed ledger systems rather than adding the first and second partial hash of a summary file of an electronic record of a process to a block directly.

Referring to FIG. 21, shown is Block Diagram 2100 comprising a flow to write a hash of a first partial summary file to a first public distributed ledger (1603) and a hash of a second partial summary file to a second public distributed ledger (1604). The flow shown in Block Diagram 2100 comprises of eleven steps and begins with step 2101 in which a process completes so that no further event data or documents are going to be added to the electronic record of the process, which triggers Component 1106 to create and save a summary file of the electronic record and to associate the summary file to the electronic record itself. In step 2102 Component 1106 splits the summary file of an electronic record into two parts, creates a hash for each part, stores both hashes using Component 1114 and associates both hashes and both parts of a summary file with the electronic record and the original summary file. In step 2103 Component 1106 notifies Component 1113 that a first and second hash for two parts of a summary file of an electronic record are available to be added to two public distributed ledgers. In step 2104 Component 1113 requests that a hash of a first part of a summary file be added to a first public distributed ledger (1603) and in step 2105 Component 1113 requests that a hash of a second part of a summary file be added to a second public distributed ledger (1604). In step 2106 Component 1113 adds a hash of a first part of a summary file to a block and broadcasts the transaction to a first network of nodes participating in a first public distributed ledger (1604). In step 2107 Component 1113 adds a hash of a second part of a summary file to a block and broadcasts the transaction to a second network of nodes participating in a second public distributed ledger (1604). In step 2108 the nodes in a first network validate the transaction and add a hash of a first part of a summary file to their blocks. In step 2109 the nodes in a second network validate the transaction and add a hash of a second part of a summary file to their blocks. In step 2110 a hash of a first part of a summary file has been added to a first block and to a first public distributed ledger (1603). In step 2111 a hash of a second part of a summary file has been added to a block and to a second public distributed ledger (1604).

Not shown in Block Diagram 2100, in some embodiments of the present invention a hash of a partial electronic record, partial event data, a partial document, or partial user credentials may be written to two or more public or private distributed ledgers. Still further not shown in Block Diagram 2100 in certain embodiments of the present invention data may be written to two or more distributed ledgers at certain point in time or on certain days as opposed to immediately. Also not shown in Block Diagram 2100, in certain embodiments of the present invention a first distributed ledger may be public, and a second distributed ledger may be private or vice versa. Further not shown in Block Diagram 2100, a hash of a first and second partial summary file of an electronic record of a process may be added to blocks on two or more distributed ledgers by a system or component that is not part of System 1100. For example, Component 1113 may send the instruction to add a hash of a first and second partial summary file of an electronic record of a process to block on two or more distributed ledgers to one, two or more dedicated distributed ledger systems rather than adding the hash of a first and second partial summary file of an electronic record of a process to a block directly.

The use of the term "or" in the claims is used to mean "and/or" unless explicitly indicated to refer to alternatives only or the alternatives are mutually exclusive, although the disclosure supports a definition that refers to only alternatives and to "and/or." When used in conjunction with the word "comprising" or other open language in the claims, the words "a" and "an" denote "one or more," unless specifically noted. The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to, possessing only those one or more steps and also covers other unlisted steps.

Unless indicated otherwise, or otherwise clearly contradicted by context, the steps in the methods disclosed herein can be performed in any order.

What is claimed is:

1. A system for creating, sharing and updating an electronic record of a process, the system comprising:
   a computer storing computing instructions that when executed by the computer cause the computer to:
   a) execute a registration dashboard to register a first user if the first user is unknown to the system or recognize the first user if the first user is known to the system and permit the first user to access the system after registration or recognition;
   b) execute a registration data management dashboard for storing registration information of the first user;
   c) execute an electronic record management dashboard for creating an electronic record; the first user creating the electronic record comprising a first record identifier and a first data element;
   d) execute an invitation dashboard, the invitation dashboard allowing the first user to invite a second user to access the system, the registration dashboard registering the second user if the second user is unknown to the system or recognizing the second user if the second user is known to the system and allowing the second user to have access to the electronic record after registration or recognition, and the registration data management dashboard storing registration information of the second user; and
   e) execute an operator invite dashboard for the first user or the second user to invite an operator to access the system, the registration dashboard registering the operator if the operator is unknown to the system or recognizing the operator if the operator is known to the system and allowing the operator to have access to the electronic record after registration or recognition, and the registration data management component storing registration information of the operator,
      wherein the operator is designated by the system to transport a supply chain asset in a supply chain process, and wherein the first user or the second user, whichever user that invited the operator to access the system, disables a dashboard view preventing display of at least one of the following to the other user: an identity of the operator, event data of the supply chain asset or the supply chain process, or document data stored as port of the supply chain asset in a supply chain process.

2. The system of claim 1, wherein the first or second user or the operator utilizes the electronic record management dashboard to update the electronic record by adding a second data element to the electronic record.

3. The system of claim 1, wherein the first user, the second user or the operator utilizes the invitation dashboard to invite a third user to access the system, the registration dashboard registering the third user if the third user is unknown to the system or recognizing the third user if the third user is known to the system and allowing the third user to have access to the electronic record after registration or recognition and the registration data management dashboard storing registration information of the third user.

4. The system of claim 3, wherein the first, second or third user or the operator utilizes the electronic record management dashboard to update the electronic record by adding a second data element to the electronic record.

5. The system of claim 4, wherein the first user, the second user, the third user or the operator utilizes the invitation dashboard to invite a fourth user to access the system, the registration dashboard registering the fourth user if the fourth user is unknown to the system or recognizing the fourth user if the fourth user is known to the system and allowing the fourth user to have access to the electronic record after registration or recognition and the registration data management dashboard storing registration information of the fourth user.

6. The system of claim 1, further comprising a storage dashboard for storing the electronic record.

7. The system of claim 1, further comprising an external data source access dashboard for accessing and storing external data.

8. The system of claim 7, further comprising an external data source storage dashboard for storing external data.

9. The system of claim 1, further comprising a summary file comprising all of the data elements of the electronic record.

10. A system for creating, sharing and updating an electronic record of a process, the system comprising:
    a computer storing computing instructions that when executed by the computer cause the computer to:
    a) execute a registration dashboard to register a first user if the first user is unknown to the system or recognize the first user if the first user is known to the system and permit the first user to access the system after registration or recognition;
    b) execute a registration data management dashboard for storing registration information of the first user;
    c) execute an electronic record management dashboard for creating an electronic record; the first user creating the electronic record comprising a first record identifier and a first data element;
    d) execute an invitation dashboard, the invitation dashboard allowing the first user to invite a second user to access the system, the registration dashboard registering the second user if the second user is unknown to the system or recognizing the second user if the second user is known dashboard the system and allowing the second user to have access to the electronic record after registration or recognition, and the registration data management dashboard storing registration information of the second user;
    e) execute an operator invite dashboard for the first user or the second user to invite an operator to access the system, the registration dashboard registering the operator if the operator is unknown to the system or recognizing the operator if the operator is known to the system and allowing the operator to have access to the electronic record after registration or recognition, and the registration data management dashboard storing registration information of the operator; and
    f) execute a distributed ledger connector dashboard for connecting the system to a first distributed ledger,
       wherein the operator is designated by the system to transport a supply chain asset in a supply chain process, and wherein the first user or the second user, whichever user that invited the operator to access the system, disables a dashboard view preventing display of at least one of the following to the other user: the identity of the operator, event data of the supply chain asset or the supply chain process, or document data stored as port of the supply chain asset in a supply chain process.

11. The system of claim 10, wherein the first or second user or the operator utilizes the electronic record management dashboard to update the electronic record by adding a second data element to the electronic record.

12. The system of claim 10, wherein the first user, the second user or the operator utilizes the invitation dashboard to invite a third user to access the system, the registration dashboard registering the third user if the third user is unknown to the system or recognizing the third user if the third user is known to the system and allowing the third user to have access to the electronic record after registration or recognition and the registration data management dashboard storing registration information of the third user.

13. The system of claim 12, wherein the first, second or third user or the operator utilizes the electronic record management dashboard to update the electronic record by adding a second data element to the electronic record.

14. The system of claim 10, further comprising a storage dashboard for storing the electronic record.

15. The system of claim 10, further comprising an external data source access dashboard for accessing and storing external data.

16. The system of claim 15, further comprising an external data source storage dashboard for storing external data.

17. The system of claim 10, further comprising a summary file comprising all of the data elements of the electronic record.

18. The system of claim 10, wherein the distributed ledger connector dashboard adds the electronic record to a first block and broadcasts the first block to a plurality of nodes of the first distributed ledger to validate and store the first block on the first distributed ledger.

19. The system of claim 18, wherein the electronic record management dashboard calculates a hash value of the electronic record, the distributed ledger connector dashboard sends the hash value to the first distributed ledger and adds the hash value to a second block and broadcasts the second block to the plurality of nodes of the first distributed ledger to validate and store the second block on the first distributed ledger.

20. The system of claim 10, wherein the distributed ledger connector dashboard connects the system to a first distributed ledger and a second distributed ledger.

* * * * *